US008210922B2

(12) United States Patent
Williams et al.

(10) Patent No.: US 8,210,922 B2
(45) Date of Patent: Jul. 3, 2012

(54) SEPARABLE GAME GRAPHICS ON A GAMING MACHINE

(75) Inventors: David C. Williams, Carson City, NV (US); Joseph R. Hedrick, Reno, NV (US); Kurt Larsen, Reno, NV (US)

(73) Assignee: IGT, Reno, NV (US)

( * ) Notice: Subject to any disclaimer, the term of this patent is extended or adjusted under 35 U.S.C. 154(b) by 263 days.

(21) Appl. No.: 11/858,693

(22) Filed: Sep. 20, 2007

(65) Prior Publication Data

US 2008/0113745 A1 May 15, 2008

Related U.S. Application Data

(60) Provisional application No. 60/858,741, filed on Nov. 13, 2006.

(51) Int. Cl.
*A63F 13/00* (2006.01)

(52) U.S. Cl. ................................ 463/20; 345/2; 463/31

(58) Field of Classification Search .................... 463/31
See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,607,844 | A | 8/1986 | Fullerton |
| 4,621,814 | A | 11/1986 | Stephen et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,152,529 | A | 10/1992 | Okada |
| 5,319,491 | A | 6/1994 | Selbrede |
| 5,342,047 | A | 8/1994 | Heidel et al. |
| 5,364,100 | A | 11/1994 | Ludlow et al. |
| 5,375,830 | A | 12/1994 | Takemoto et al. |
| 5,376,587 | A | 12/1994 | Buchmann et al. |

(Continued)

FOREIGN PATENT DOCUMENTS

AU 721968 7/2000

(Continued)

OTHER PUBLICATIONS

International Search Report and Written Opinion, mailed Jun. 11, 2008 for PCT/US2007/084469.

(Continued)

*Primary Examiner* — Dmitry Suhol
*Assistant Examiner* — Malina K Rustemeyer
(74) *Attorney, Agent, or Firm* — Weaver Austin Villeneuve & Sampson LLP

(57) ABSTRACT

Described herein is a gaming machine with layered displays and separable graphics that leverage the layered displays to enhance game play on a gaming machine. The separable graphics include separate but related content on each of the display panels for a game. The layered displays include a proximate screen and distal video display device that provide actual physical separation between graphics items output by proximate and distal video display devices. This distance provides parallax, which improves three-dimensional perception of video graphics and games by the gaming machine.

27 Claims, 17 Drawing Sheets

U.S. PATENT DOCUMENTS

| | | | |
|---|---|---|---|
| 5,393,057 | A | 2/1995 | Marnell |
| 5,393,061 | A | 2/1995 | Manship et al. |
| 5,395,111 | A | 3/1995 | Inoue |
| 5,467,893 | A | 11/1995 | Landis, II et al. |
| 5,539,547 | A | 7/1996 | Ishii et al. |
| 5,580,055 | A | 12/1996 | Hagiwara |
| 5,585,821 | A | 12/1996 | Ishikura et al. |
| 5,589,980 | A | 12/1996 | Bass et al. |
| 5,647,798 | A | 7/1997 | Falciglia |
| 5,725,428 | A | 3/1998 | Achmueller |
| 5,745,197 | A | 4/1998 | Leung et al. |
| 5,752,881 | A | 5/1998 | Inoue |
| 5,762,552 | A | 6/1998 | Vuong et al. |
| 5,764,317 | A | 6/1998 | Sadnovik et al. |
| 5,785,315 | A | 7/1998 | Eiteneer et al. |
| 5,788,573 | A | 8/1998 | Baerlocher et al. |
| 5,833,537 | A | 11/1998 | Barrie |
| 5,851,148 | A | 12/1998 | Brune et al. |
| 5,910,046 | A | 6/1999 | Wada et al. |
| 5,923,307 | A | 7/1999 | Hogle, IV |
| 5,951,397 | A | 9/1999 | Dickinson |
| 5,956,180 | A | 9/1999 | Bass et al. |
| 5,967,893 | A | 10/1999 | Lawrence et al. |
| 5,988,638 | A | 11/1999 | Rodesch et al. |
| 5,993,027 | A | 11/1999 | Yamamoto et al. |
| 6,001,016 | A | 12/1999 | Walker et al. |
| 6,015,346 | A | 1/2000 | Bennett |
| 6,027,115 | A | 2/2000 | Griswold et al. |
| 6,050,895 | A | 4/2000 | Luciano et al. |
| 6,054,969 | A | 4/2000 | Haisma |
| 6,057,814 | A | 5/2000 | Kalt |
| 6,059,289 | A | 5/2000 | Vancura |
| 6,059,658 | A | 5/2000 | Mangano et al. |
| 6,068,552 | A | 5/2000 | Walker |
| 6,086,066 | A | 7/2000 | Takeuchi et al. |
| 6,093,102 | A | 7/2000 | Bennett |
| 6,135,884 | A | 10/2000 | Hedrick et al. |
| 6,159,095 | A | 12/2000 | Frohm et al. |
| 6,159,098 | A | 12/2000 | Slomiany et al. |
| 6,168,520 | B1 | 1/2001 | Baerlocher et al. |
| 6,190,255 | B1 | 2/2001 | Thomas et al. |
| 6,213,875 | B1 | 4/2001 | Suzuki |
| 6,227,971 | B1 | 5/2001 | Weiss |
| 6,234,897 | B1 | 5/2001 | Frohm et al. |
| 6,244,596 | B1 | 6/2001 | Kondratjuk |
| 6,251,013 | B1 | 6/2001 | Bennett |
| 6,251,014 | B1 | 6/2001 | Stockdale et al. |
| 6,252,707 | B1 | 6/2001 | Kleinberger et al. |
| 6,254,481 | B1 | 7/2001 | Jaffe |
| 6,261,178 | B1 | 7/2001 | Bennett |
| 6,270,411 | B1 | 8/2001 | Gura et al. |
| 6,297,785 | B1 | 10/2001 | Sommer et al. |
| 6,315,666 | B1 | 11/2001 | Mastera et al. |
| 6,322,445 | B1 | 11/2001 | Miller |
| 6,337,513 | B1 | 1/2002 | Clevenger et al. |
| 6,347,996 | B1 | 2/2002 | Gilmore et al. |
| 6,368,216 | B1 | 4/2002 | Hedrick et al. |
| 6,379,244 | B1 | 4/2002 | Sagawa et al. |
| 6,398,220 | B1 | 6/2002 | Inoue |
| 6,404,436 | B1 | 6/2002 | Goden |
| 6,416,827 | B1 | 7/2002 | Chakrapani et al. |
| 6,444,496 | B1 | 9/2002 | Edwards et al. |
| 6,445,185 | B1 | 9/2002 | Damadian et al. |
| 6,491,583 | B1 | 12/2002 | Gauselmann |
| 6,503,147 | B1 | 1/2003 | Stockdale et al. |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,433 | B2 | 2/2003 | Loose et al. |
| 6,517,437 | B1 | 2/2003 | Wells et al. |
| 6,520,856 | B1 | 2/2003 | Walker et al. |
| 6,532,146 | B1 | 3/2003 | Duquette |
| 6,547,664 | B2 | 4/2003 | Saunders |
| 6,575,541 | B1 | 6/2003 | Hedrick et al. |
| 6,585,591 | B1 | 7/2003 | Baerlocher et al. |
| 6,612,927 | B1 | 9/2003 | Slomiany |
| D480,961 | S | 10/2003 | Deadman |
| 6,643,124 | B1 | 11/2003 | Wilk |
| 6,644,664 | B2 | 11/2003 | Muir et al. |
| 6,646,695 | B1 | 11/2003 | Gauselmann |
| 6,652,378 | B2 | 11/2003 | Cannon et al. |
| 6,659,864 | B2 | 12/2003 | McGahn et al. |
| 6,661,425 | B1 | 12/2003 | Hiroaki |
| 6,695,696 | B1 | 2/2004 | Kaminkow |
| 6,695,703 | B1 | 2/2004 | McGahn |
| 6,702,675 | B2 | 3/2004 | Poole et al. |
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,782,281 | B1 | 8/2004 | Nagasawa et al. |
| 6,802,777 | B2 | 10/2004 | Seelig et al. |
| 6,817,945 | B2 | 11/2004 | Seelig et al. |
| 6,817,946 | B2 | 11/2004 | Motegi et al. |
| 6,859,219 | B1 | 2/2005 | Sall |
| 6,887,157 | B2 | 5/2005 | LeMay et al. |
| 6,890,259 | B2 | 5/2005 | Breckner et al. |
| 6,906,762 | B1 | 6/2005 | Witehira et al. |
| 6,908,381 | B2 | 6/2005 | Ellis |
| 6,937,298 | B2 | 8/2005 | Okada |
| 6,981,635 | B1 | 1/2006 | Hughs-Baird et al. |
| 7,040,987 | B2 | 5/2006 | Walker et al. |
| 7,056,215 | B1 | 6/2006 | Olive |
| 7,095,180 | B2 | 8/2006 | Emslie et al. |
| 7,097,560 | B2 | 8/2006 | Okada |
| 7,108,603 | B2 | 9/2006 | Olive |
| 7,128,647 | B2 | 10/2006 | Muir |
| 7,159,865 | B2 | 1/2007 | Okada |
| 7,160,187 | B2 | 1/2007 | Loose et al. |
| 7,166,029 | B2 | 1/2007 | Enzminger |
| 7,204,753 | B2 * | 4/2007 | Ozaki et al. .................... 463/16 |
| 7,207,883 | B2 | 4/2007 | Nozaki et al. |
| 7,220,181 | B2 | 5/2007 | Okada |
| 7,227,510 | B2 | 6/2007 | Mayer, III et al. |
| 7,237,202 | B2 | 6/2007 | Gage |
| 7,252,288 | B2 | 8/2007 | Seelig et al. |
| 7,252,591 | B2 | 8/2007 | Van Asdale |
| 7,255,643 | B2 | 8/2007 | Ozaki et al. |
| 7,274,413 | B1 | 9/2007 | Sullivan et al. |
| 7,285,049 | B1 | 10/2007 | Luciano, Jr. et al. |
| 7,309,284 | B2 | 12/2007 | Griswold et al. |
| 7,322,884 | B2 | 1/2008 | Emori et al. |
| 7,324,094 | B2 | 1/2008 | Moilanen et al. |
| 7,329,181 | B2 | 2/2008 | Hoshino et al. |
| 7,352,424 | B2 | 4/2008 | Searle |
| 7,439,683 | B2 | 10/2008 | Emslie |
| 7,473,173 | B2 | 1/2009 | Peterson et al. |
| 7,505,049 | B2 | 3/2009 | Engel |
| 7,510,475 | B2 * | 3/2009 | Loose et al. .................... 463/31 |
| 7,558,057 | B1 | 7/2009 | Naksen et al. |
| 7,559,837 | B1 | 7/2009 | Yoseloff et al. |
| 7,619,585 | B2 | 11/2009 | Bell et al. |
| 7,624,339 | B1 | 11/2009 | Engel et al. |
| 7,626,594 | B1 | 12/2009 | Witehira et al. |
| 7,724,208 | B1 | 5/2010 | Engel et al. |
| 7,730,413 | B1 | 6/2010 | Engel |
| 7,742,124 | B2 | 6/2010 | Bell |
| 7,742,239 | B2 | 6/2010 | Bell |
| 7,841,944 | B2 | 11/2010 | Wells |
| 7,951,001 | B2 | 5/2011 | Wells |
| 8,012,010 | B2 | 9/2011 | Wilson et al. |
| 8,115,700 | B2 | 2/2012 | Schlottmann et al. |
| 8,118,670 | B2 | 2/2012 | Griswold et al. |
| 2001/0013681 | A1 | 8/2001 | Bruzzese et al. |
| 2002/0045472 | A1 | 4/2002 | Adams |
| 2002/0173354 | A1 | 11/2002 | Winans et al. |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0087690 | A1 | 5/2003 | Loose et al. |
| 2003/0130026 | A1 | 7/2003 | Breckner et al. |
| 2003/0130028 | A1 | 7/2003 | Aida et al. |
| 2003/0148804 | A1 | 8/2003 | Ikeya et al. |
| 2003/0157980 | A1 | 8/2003 | Loose et al. |
| 2003/0176214 | A1 | 9/2003 | Burak et al. |
| 2003/0199295 | A1 | 10/2003 | Vancura |
| 2003/0220134 | A1 | 11/2003 | Walker et al. |

2003/0234489 A1 12/2003 Okada
2003/0236114 A1 12/2003 Griswold et al.
2003/0236118 A1 12/2003 Okada
2004/0002372 A1 1/2004 Rodgers et al.
2004/0009803 A1 1/2004 Bennett et al.
2004/0023714 A1 2/2004 Asdale
2004/0029636 A1* 2/2004 Wells .............................. 463/32
2004/0036218 A1 2/2004 Inoue
2004/0048645 A1 3/2004 Webb et al.
2004/0053660 A1 3/2004 Webb et al.
2004/0063490 A1 4/2004 Okada
2004/0066475 A1 4/2004 Searle
2004/0077401 A1 4/2004 Schlottmann et al.
2004/0102244 A1 5/2004 Kryuchkov et al.
2004/0102245 A1 5/2004 Escalera et al.
2004/0116178 A1 6/2004 Okada
2004/0142748 A1 7/2004 Loose et al.
2004/0147303 A1 7/2004 Imura et al.
2004/0150162 A1 8/2004 Okada
2004/0162146 A1 8/2004 Ooto
2004/0166925 A1 8/2004 Emori et al.
2004/0166927 A1 8/2004 Okada
2004/0171423 A1 9/2004 Silva et al.
2004/0183251 A1 9/2004 Inoue
2004/0183972 A1 9/2004 Bell
2004/0192430 A1 9/2004 Burak et al.
2004/0198485 A1 10/2004 Loose
2004/0207154 A1 10/2004 Okada
2004/0209666 A1 10/2004 Tashiro
2004/0209667 A1 10/2004 Emori et al.
2004/0209668 A1 10/2004 Okada
2004/0209671 A1 10/2004 Okada
2004/0209672 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0219967 A1 11/2004 Giobbi et al.
2004/0224747 A1 11/2004 Okada
2004/0227721 A1 11/2004 Moilanen et al.
2004/0233663 A1 11/2004 Emslie et al.
2004/0235558 A1 11/2004 Beaulieu et al.
2004/0239582 A1 12/2004 Seymour
2004/0266515 A1 12/2004 Gauselmann
2004/0266536 A1 12/2004 Mattice et al.
2005/0020348 A1 1/2005 Thomas et al.
2005/0026673 A1 2/2005 Paulsen et al.
2005/0032571 A1 2/2005 Asonuma
2005/0037843 A1 2/2005 Wells et al.
2005/0049032 A1 3/2005 Kobayashi
2005/0049033 A1 3/2005 Kojima
2005/0049046 A1 3/2005 Kobayashi
2005/0052341 A1 3/2005 Henriksson
2005/0062410 A1 3/2005 Bell et al.
2005/0063055 A1 3/2005 Engel
2005/0079913 A1 4/2005 Inamura
2005/0085292 A1 4/2005 Inamura
2005/0145366 A1 7/2005 Erel
2005/0153772 A1 7/2005 Griswold et al.
2005/0153775 A1 7/2005 Griswold et al.
2005/0164786 A1 7/2005 Connelly
2005/0176493 A1 8/2005 Nozaki et al.
2005/0192090 A1 9/2005 Muir et al.
2005/0206582 A1 9/2005 Bell et al.
2005/0208994 A1 9/2005 Berman
2005/0233799 A1 10/2005 LeMay et al.
2005/0239539 A1 10/2005 Inamura
2005/0253775 A1 11/2005 Stewart
2005/0255908 A1 11/2005 Wells et al.
2005/0266912 A1 12/2005 Sekiguchi
2005/0285337 A1 12/2005 Durham et al.
2006/0025199 A1 2/2006 Harkins et al.
2006/0058100 A1 3/2006 Pacey et al.
2006/0063580 A1 3/2006 Nguyen et al.
2006/0073881 A1 4/2006 Pryzby
2006/0100014 A1 5/2006 Griswold et al.
2006/0103951 A1 5/2006 Bell et al.
2006/0111179 A1 5/2006 Inamura
2006/0125745 A1 6/2006 Evanicky
2006/0166727 A1 7/2006 Burak
2006/0191177 A1 8/2006 Engel
2006/0256033 A1 11/2006 Chan et al.
2006/0284574 A1 12/2006 Emslie et al.
2006/0290594 A1* 12/2006 Engel et al. ...................... 345/4
2007/0004510 A1 1/2007 Underdahl et al.
2007/0004513 A1 1/2007 Wells et al.
2007/0010315 A1 1/2007 Hein
2007/0057866 A1 3/2007 Lee et al.
2007/0072665 A1 3/2007 Muir
2007/0077986 A1 4/2007 Loose
2007/0091011 A1 4/2007 Selbrede
2007/0105610 A1 5/2007 Anderson
2007/0105611 A1 5/2007 O'Halloran
2007/0105628 A1 5/2007 Arbogast et al.
2007/0252804 A1 11/2007 Engel
2008/0004104 A1 1/2008 Durham et al.
2008/0007486 A1 1/2008 Fujinawa et al.
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0064497 A1 3/2008 Griswold et al.
2008/0068290 A1 3/2008 Muklashy et al.
2008/0096655 A1 4/2008 Rasmussen et al.
2008/0108422 A1 5/2008 Hedrick et al.
2008/0113716 A1 5/2008 Beadell et al.
2008/0113746 A1 5/2008 Williams et al.
2008/0113747 A1 5/2008 Williams et al.
2008/0113748 A1 5/2008 Williams et al.
2008/0113749 A1 5/2008 Williams et al.
2008/0113756 A1 5/2008 Williams et al.
2008/0113775 A1 5/2008 Williams et al.
2008/0125219 A1 5/2008 Williams et al.
2008/0136741 A1 6/2008 Williams et al.
2008/0261674 A9 10/2008 Okada
2008/0284792 A1 11/2008 Bell
2009/0036208 A1 2/2009 Pennington et al.
2009/0061983 A1 3/2009 Kaufman et al.
2009/0061984 A1 3/2009 Yi et al.
2009/0069069 A1 3/2009 Crowder, Jr. et al.
2009/0069070 A1 3/2009 Crowder, Jr. et al.
2009/0079667 A1 3/2009 Schlottmann et al.
2009/0082083 A1 3/2009 Wilson et al.
2009/0091513 A1 4/2009 Kuhn
2009/0104989 A1 4/2009 Williams et al.
2009/0111577 A1 4/2009 Mead
2009/0111578 A1 4/2009 Griswold et al.
2009/0117993 A1 5/2009 Bigelow, Jr. et al.
2009/0258697 A1 10/2009 Kelly et al.
2009/0258701 A1 10/2009 Crowder, Jr. et al.
2009/0280888 A1 11/2009 Durham et al.
2009/0312095 A1 12/2009 Durham et al.
2010/0045601 A1 2/2010 Engel et al.
2010/0115391 A1 5/2010 Engel et al.
2010/0115439 A1 5/2010 Engel
2010/0190545 A1 7/2010 Lauzon et al.
2010/0214195 A1 8/2010 Ogasawara et al.
2010/0234089 A1 9/2010 Saffari et al.
2011/0065490 A1 3/2011 Lutnick
2011/0201404 A1 8/2011 Wells

FOREIGN PATENT DOCUMENTS

AU 2000PQ9586 8/2000
CA 2265283 9/1999
EP 0 454 423 10/1991
EP 0 484 103 5/1992
EP 0 860 807 8/1998
EP 0 919 965 6/1999
EP 0 997 857 10/1999
EP 1 000 642 A2 5/2000
EP 1 260 928 11/2002
EP 1 282 088 2/2003
EP 1 369 830 12/2003
EP 1 391 847 2/2004
EP 1 462 152 A2 9/2004
EP 1 465 126 10/2004
EP 1 492 063 12/2004
EP 1 571 626 9/2005

| | | | |
|---|---|---|---|
| EP | 1 762 992 | A3 | 3/2007 |
| EP | 1 826 739 | | 8/2007 |
| GB | 1 464 896 | | 2/1977 |
| GB | 2 120 506 | | 11/1983 |
| GB | 2 253 300 | | 9/1992 |
| GB | 2 316 214 | | 2/1998 |
| GB | 2 385 004 | A | 8/2003 |
| JP | H02-90884 | | 7/1990 |
| JP | H03-20388 | | 2/1991 |
| JP | 04-220276 | | 8/1992 |
| JP | H05-68585 | | 9/1993 |
| JP | 06-043425 | | 2/1994 |
| JP | 07-124290 | | 5/1995 |
| JP | H10-015247 | | 1/1998 |
| JP | 10-234932 | A | 9/1998 |
| JP | 11-000441 | A | 1/1999 |
| JP | H11-137852 | | 5/1999 |
| JP | 2000-245963 | | 9/2000 |
| JP | 2000-300729 | | 10/2000 |
| JP | 00-350805 | | 12/2000 |
| JP | 2000-354685 | | 12/2000 |
| JP | 01-062032 | | 3/2001 |
| JP | 01-238995 | | 9/2001 |
| JP | 01-252393 | | 9/2001 |
| JP | 01-252394 | | 9/2001 |
| JP | 2001-353254 | | 12/2001 |
| JP | 02-085624 | | 3/2002 |
| JP | 2004-089707 | | 3/2004 |
| JP | 2004-105616 | | 4/2004 |
| JP | 04-166879 | | 6/2004 |
| JP | 2005-253561 | | 9/2005 |
| JP | 2005-266387 | | 9/2005 |
| JP | 2005-266388 | | 9/2005 |
| JP | 2005-274906 | | 10/2005 |
| JP | 2005-274907 | | 10/2005 |
| JP | 2005-283864 | | 10/2005 |
| JP | 2006-043425 | | 2/2006 |
| JP | 2006-059607 | | 3/2006 |
| JP | 2006-346226 | | 12/2006 |
| JP | 2007-200869 | | 8/2007 |
| RU | 2 053 559 | C1 | 1/1996 |
| RU | 2 145 116 | C1 | 1/2000 |
| RU | 29794 | U1 | 5/2003 |
| WO | WO 93/13446 | | 7/1993 |
| WO | 99/42889 | | 8/1999 |
| WO | 99/44095 | | 9/1999 |
| WO | WO 99/53454 | | 10/1999 |
| WO | WO 00/32286 | | 6/2000 |
| WO | 01/15127 | | 3/2001 |
| WO | 01/15128 | | 3/2001 |
| WO | 01/15132 | | 3/2001 |
| WO | WO 01/38926 | | 5/2001 |
| WO | 01/09664 | | 8/2001 |
| WO | WO 02/41046 | | 5/2002 |
| WO | WO 02/084637 | | 10/2002 |
| WO | WO 02/086610 | | 10/2002 |
| WO | WO 02/089102 | | 11/2002 |
| WO | WO 03/001486 | | 1/2003 |
| WO | WO 03/023491 | | 3/2003 |
| WO | WO 03/032058 | | 4/2003 |
| WO | 03/039699 | | 5/2003 |
| WO | WO 03/040820 | | 5/2003 |
| WO | PCT/NZ03/00153 | * | 8/2003 |
| WO | WO 03/079094 | | 9/2003 |
| WO | 04/001486 | | 12/2003 |
| WO | WO 2004/001488 | | 12/2003 |
| WO | WO 2004/002143 | | 12/2003 |
| WO | WO 2004/008226 | | 1/2004 |
| WO | WO 2004/023825 | | 3/2004 |
| WO | WO 2004/025583 | | 3/2004 |
| WO | WO 2004/036286 | | 4/2004 |
| WO | WO 2004/060512 | | 7/2004 |
| WO | WO 2004/079674 | | 9/2004 |
| WO | 2004/102520 | | 11/2004 |
| WO | WO 2004102520 | A1 * | 11/2004 |
| WO | WO 2005/071629 | | 8/2005 |
| WO | 2006/034192 | | 3/2006 |
| WO | 2006/038819 | | 4/2006 |
| WO | WO 2006/112740 | | 10/2006 |
| WO | WO 2007/040413 | | 4/2007 |
| WO | WO 2008/005278 | | 1/2008 |
| WO | WO 2008/028153 | | 3/2008 |
| WO | WO 2008/048857 | | 4/2008 |
| WO | WO 2008/061068 | | 5/2008 |
| WO | WO 2008/062914 | | 5/2008 |
| WO | WO 2008/063908 | | 5/2008 |
| WO | WO 2008/063914 | | 5/2008 |
| WO | WO 2008/063952 | | 5/2008 |
| WO | WO 2008/063956 | | 5/2008 |
| WO | WO 2008/063968 | | 5/2008 |
| WO | WO 2008/063969 | | 5/2008 |
| WO | WO 2008/063971 | | 5/2008 |
| WO | WO 2008/079542 | | 7/2008 |
| WO | WO 2009/029720 | | 3/2009 |
| WO | WO 2009/039245 | | 3/2009 |
| WO | WO 2009/039295 | | 3/2009 |
| WO | WO 2009/054861 | | 4/2009 |
| WO | WO 2010/023537 | | 3/2010 |
| WO | WO 2010/039411 | | 4/2010 |

OTHER PUBLICATIONS

International Search Report, 5 page document, International Application No. PCT/US2005/000950, Dated Jun. 2, 2005.
Written Opinion of the International Searching Authority, 7 page document, International Application No. PCT/US2005/000950, Dated Jun. 2, 2005.
"Light Valve". [online] [retrieved on Nov. 15, 2005]. Retrieved from the Internet URL http://www.meko.co.uk/lightvalve.shtml (1 page).
"Liquid Crystal Display". [online]. [retrieved on Nov. 16, 2005]. Retrieved form the Internet URL http://en.wikipedia.org/wiki/LCD (6 pages).
Bonsor, Kevin, "How Smart Windows Will Work," Howstuffworks, Inc. 1998-2002, http://www/howstuffworks.com/smart-window.htm/printable. Printed Nov. 25, 2002 (5 pages).
"What is SPD?" SPD Systems, Inc. 2002, http://www.spd-systems.com/spdq.htm. Printed Dec. 4, 2002 (2 pages).
"Debut of the Let's Make a Deal Slot Machine," Let's Make a Deal 1999-2002, http:///www.letsmakeadeal.com/pr01.htm. Printed Dec. 3, 2002 (2 pages).
Living in a flat world? Advertisement written by Deep Video Imaging Ltd., published 2000.
Novel 3-D Video Display Technology Developed, News release: Aug. 30, 1996, www.eurekalert.org/summaries/1199.html, printed from Internet Archive using date Sep. 2, 2000.
Time Multiplexed Optical Shutter (TMOS): A revolutionary Flat Screen Display Technology, www.vea.com/TMOS.html, Apr. 8, 1999, printed from Internet Archive using date Oct. 6, 1999.
Time Multiplexed Optical Shutter (TMOS): A revolutionary Flat Screen Display Technology, www.tralas.com/TMOS.html, Apr. 5, 2001, printed from Internet Archive using date Apr. 11, 2001.
Written Opinion of the International Searching Authority dated May 25, 2005, for PCT Application No. PCT/US2005/000597.
Bosner, "How Smart Windows Work," HowStuffWorks, Inc.,www.howstuffworks.com, 1998-2004, 9 pages.
Saxe et al., "Suspended-Particle Devices," www.refr-spd.com, Apr./May 1996, 5 pages.
"SPD," Malvino Inc., www.malvino.com, Jul. 19, 1999, 10 pages.
International Exam Report dated Sep. 21, 2007 in European Application No. 05 705 315.9.
U.S. Appl. No. 11/849,119, filed Aug. 31, 2007.
U.S. Appl. No. 11/858,695, filed Sep. 20, 2007.
U.S. Appl. No. 11/858,845, filed Sep. 20, 2007.
U.S. Appl. No. 11/858,849, filed Sep. 20, 2007.
U.S. Appl. No. 11/859,127, filed Sep. 21, 2007.
U.S. Appl. No. 11/938,184, filed Nov. 9, 2007.
U.S. Appl. No. 11/877,611, filed Oct. 23, 2007.
U.S. Appl. No. 11/938,086, filed Nov. 9, 2007.
U.S. Appl. No. 11/938,151, filed Nov. 9, 2007.
Office Action dated Aug. 29, 2007 from U.S. Appl. No. 10/755,598.
Office Action dated Oct. 31, 2007 from U.S. Appl. No. 10/213,626.
Final Office Action dated Mar. 28, 2007 from U.S. Appl. No. 10/213,626.
Office Action dated Apr. 27, 2006 from U.S. Appl. No. 10/213,626.

Final Office Action dated Jan. 10, 2006 from U.S. Appl. No. 10/213,626.
Office Action dated Aug. 31, 2004 from U.S. Appl. No. 10/213,626.
US Office Action dated Mar. 3, 2010 issued in U.S. Appl. No. 11/938,086.
US Office Action Final dated Aug. 19, 2010 issued in U.S. Appl. No. 11/938,086.
US Office Action dated Dec. 3, 2010 issued in U.S. Appl. No. 11/938,086.
US Notice of Allowance dated Apr. 18, 2011 issued in U.S. Appl. No. 11/938,086.
US Notice of Allowance dated Oct. 7, 2011 issued in U.S. Appl. No. 11/938,086.
US Office Action dated Oct. 9, 2009 issued in U.S. Appl. No. 11/514,808.
US Office Action Final dated Apr. 22, 2010 issued in U.S. Appl. No. 11/514,808.
US Office Action and Examiner Interview Summary dated Oct. 18, 2010 issued in U.S. Appl. No. 11/514,808.
US Office Action Final dated Apr. 27, 2011 issued in U.S. Appl. No. 11/514,808.
US Office Action dated Dec. 2, 2009 issued in U.S. Appl. No. 11/829,852.
US Office Action dated Jul. 14, 2010 issued in U.S. Appl. No. 11/829,852.
US Office Action dated Nov. 14, 2008 issued in U.S. Appl. No. 11/829,853.
US Office Action dated Oct. 31, 2008 issued in U.S. Appl. No. 11/829,849.
US Office Action dated Oct. 5, 2011 issued in U.S. Appl. No. 12/245,490.
US Office Action Final dated Apr. 23, 2008 issued in U.S. Appl. No. 10/755,598.
US Office Action dated Oct. 8, 2008 issued in U.S. Appl. No. 10/755,598.
US Office Action Final dated Jul. 1, 2009 issued in U.S. Appl. No. 10/755,598.
US Office Action Final dated Jan. 22, 2010 issued in U.S. Appl. No. 10/755,598.
US Office Action Final dated Aug. 4, 2010 issued in U.S. Appl. No. 10/755,598.
US Notice of Panel Decision from Pre-Appeal Brief Review dated Dec. 1, 2010 issued in U.S. Appl. No. 10/755,598.
US Office Action dated Mar. 28, 2011 issued in U.S. Appl. No. 10/755,598.
US Office Action Final dated Nov. 8, 2011 issued in U.S. Appl. No. 10/755,598.
US Office Action dated Oct. 31, 2008 issued in U.S. Appl. No. 11/829,917.
US Office Action Final dated Aug. 11, 2009 issued in U.S. Appl. No. 11/829,917.
US Office Action dated Jan. 29, 2010 issued in U.S. Appl. No. 11/829,917.
US Office Action Final dated Aug. 5, 2010 issued in U.S. Appl. No. 11/829,917.
US Office Action dated Jun. 23, 2009 issued in U.S. Appl. No. 11/938,151.
US Office Action Final dated Feb. 8, 2010 issued in U.S. Appl. No. 11/938,151.
US Advisory Action dated Apr. 22, 2010 issued in U.S. Appl. No. 11/938,151.
US Office Action dated Jul. 23, 2010 issued in U.S. Appl. No. 11/938,151.
US Office Action Final dated Jan. 4, 2011 issued in U.S. Appl. No. 11/938,151.
US Office Action (Notice of Panel Decision from Pre-Appeal Brief Review) dated Apr. 27, 2011 issued in U.S. Appl. No. 11/938,151.
US Notice of Allowance dated Sep. 12, 2011 issued in U.S. Appl. No. 11/938,151.
US Allowed Claims dated Sep. 12, 2011 issued in U.S. Appl. No. 11/938,151.
US Notice of Allowance and Allowability dated Jan. 9, 2012 issued in U.S. Appl. No. 11/938,151.
US Office Action dated Jul. 9, 2010 issued in U.S. Appl. No. 11/858,849.
US Office Action Final dated Nov. 30, 2010 issued in U.S. Appl. No. 11/858,849.
US Office Action dated Mar. 22, 2011 issued in U.S. Appl. No. 11/858,849.
US Office Action Final dated Aug. 11, 2011 issued in U.S. Appl. No. 11/858,849.
US Office Action (Advisory Action) dated Dec. 2, 2011 issued in U.S. Appl. No. 11/858,849.
US Notice of Allowance and Allowability dated Dec. 14, 2011 issued in U.S. Appl. No. 11/858,849.
US Office Action dated Jul. 9, 2009 issued in U.S. Appl. No. 11/858,700.
US Office Action Final dated Jan. 4, 2010 issued in U.S. Appl. No. 11/858,700.
US Office Action Final dated Apr. 7, 2010 issued in U.S. Appl. No. 11/858,700.
US Office Action dated Aug. 5, 2010 issued in U.S. Appl. No. 11/858,700.
US Office Action Final dated Dec. 27, 2010 issued in U.S. Appl. No. 11/858,700.
US Office Action dated Nov. 18, 2011 issued in U.S. Appl. No. 11/858,700.
US Office Action dated Jul. 9, 2009 issued in U.S. Appl. No. 11/858,695.
US Office Action Final dated Jan. 4, 2010 issued in U.S. Appl. No. 11/858,695.
US Office Action Final dated Mar. 29, 2010 issued in U.S. Appl. No. 11/858,695.
US Office Action Final dated Jul. 7, 2010 issued in U.S. Appl. No. 11/858,695.
US Office Action dated Nov. 28, 2011 issued in U.S. Appl. No. 11/858,695.
US Office Action dated Apr. 28, 2011 issued in U.S. Appl. No. 11/858,793.
US Notice of Allowance dated Oct. 12, 2011 issued in U.S. Appl. No. 11/858,793.
US Allowed Claims dated Oct. 12, 2011 issued in U.S. Appl. No. 11/858,793.
US Notice of Allowance dated Feb. 1, 2012 issued in U.S. Appl. No. 11/858,793.
US Office Action dated Jul. 10, 2009 issued in U.S. Appl. No. 11/858,845.
US Office Action Final dated Feb. 5, 2010 issued in U.S. Appl. No. 11/858,845.
US Notice of Panel Decision from Pre-Appeal Brief Review dated Jun. 8, 2010 issued in U.S. Appl. No. 11/858,845.
US Office Action dated Apr. 7, 2011 issued in U.S. Appl. No. 11/849,119.
US Office Action Final dated Sep. 6, 2011 issued in U.S. Appl. No. 11/849,119.
US Office Action dated Nov. 12, 2010 issued in U.S. Appl. No. 11/859,127.
US Notice of Allowance dated May 4, 2011 issued in U.S. Appl. No. 11/859,127.
Third Party Submission filed for U.S. Appl. No. 13/207,260 dated Jan. 31, 2012.
US Office Action dated Jan. 20, 2011 issued in U.S. Appl. No. 11/983,770.
US Office Action Final dated May 16, 2011 issued in U.S. Appl. No. 11/983,770.
US Office Action dated Jan. 20, 2012 issued in U.S. Appl. No. 11/877,611.
US Office Action dated Jun. 13, 2003 issued in U.S. Appl. No. 09/966,851.
US Office Action dated Mar. 30, 2004 issued in U.S. Appl. No. 09/966,851.
US Office Action Final dated Dec. 14, 2004 issued in U.S. Appl. No. 09/966,851.
US Notice of Allowance dated Jun. 13, 2006 issued in U.S. Appl. No. 09/966,851.

US Office Action dated Sep. 9, 2009 issued in U.S. Appl. No. 11/549,258.
US Office Action Final dated Mar. 26, 2010 issued in U.S. Appl. No. 11/549,258.
US Office Action dated Jul. 9, 2010 issued in U.S. Appl. No. 11/549,258.
US Office Action Final dated Dec. 21, 2010 issued in U.S. Appl. No. 11/549,258.
US Office Action dated Oct. 4, 2011 issued in U.S. Appl. No. 11/549,258.
US Office Action dated Sep. 3, 2010 issued in U.S. Appl. No. 11/938,632.
US Office Action Final dated Dec. 15, 2010 issued in U.S. Appl. No. 11/938,632.
US Advisory Action dated Mar. 16, 2011 issued in U.S. Appl. No. 11/938,632.
US Notice of Allowance dated May 27, 2011 issued in U.S. Appl. No. 11/938,632.
US Allowed Claims dated May 27, 2011 issued in U.S. Appl. No. 11/938,632.
US Notice of Allowance dated Oct. 5, 2011 issued in U.S. Appl. No. 11/938,632.
US Notice of Allowance dated Jan. 25, 2012 issued in U.S. Appl. No. 11/938,632.
US Office Action dated Jun. 23, 2009 issued in U.S. Appl. No. 11/938,184.
US Office Action Final dated Feb. 8, 2010 issued in U.S. Appl. No. 11/938,184.
US Office Action dated Aug, 5, 2010 issued in U.S. Appl. No. 11/938,184.
US Office Action Final dated Jan. 20, 2011 issued in U.S. Appl. No. 11/938,184.
US Advisory Action dated Mar. 25, 2011 issued in U.S. Appl. No. 11/938,184.
US Office Action dated Nov. 17, 2004 issued in U.S. Appl. No. 10/376,852.
US Office Action dated Apr. 13, 2005 issued in U.S. Appl. No. 10/376,852.
US Office Action Final dated Nov. 18, 2005 issued in U.S. Appl. No. 10/376,852.
US Advisory Action dated Feb. 7, 2006 issued in U.S. Appl. No. 10/376,852.
US Office Action dated Sep. 19, 2006 issued in U.S. Appl. No. 10/376,852.
US Notice of Informal or Non-Responsive Amendment dated Mar. 9, 2007 issued in U.S. Appl. No. 10/376,852.
US Office Action Final dated Jun. 22, 2007 issued in U.S. Appl. No. 10/376,852.
US Office Action dated Jan. 28, 2008 issued in U.S. Appl. No. 10/376,852.
US Office Action Final dated Aug. 6, 2008 issued in U.S. Appl. No. 10/376,852.
US Office Action dated Feb. 2, 2009 issued in U.S. Appl. No. 10/376,852.
US Notice of Allowance dated Nov. 10, 2009 issued in U.S. Appl. No. 10/376,852.
US Office Action dated Mar. 25, 2010 issued in U.S. Appl. No. 10/376,852.
US Advisory Action dated Apr. 5, 2006 issued in U.S. Appl. No. 10/213,626.
US Interview Summary dated Jul. 17, 2007 issued in U.S. Appl. No. 10/213,626.
US Office Action Final dated Aug. 29, 2008 issued in U.S. Appl. No. 10/213,626.
US Office Action dated Jul. 9, 2009 issued in U.S. Appl. No. 10/213,626.
US Notice of Allowance and Examiner Interview Summary dated Mar. 1, 2010 issued in U.S. Appl. No. 10/213,626.
US Notice of Allowance dated Oct. 4, 2010 issued in 10/213,626.
US Office Action dated May 24, 2007 issued in U.S. Appl. No. 11/167,655.
US Office Action dated Jan. 3, 2008 issued in U.S. Appl. No. 11/167,655.
US Office Action Final dated Mar. 8, 2008 issued in U.S. Appl. No. 11/167,655.
US Office Action Final dated Sep. 2, 2008 issued in U.S. Appl. No. 11/167,655.
US Office Action dated Jul. 17, 2009 issued in U.S. Appl. No. 11/167,655.
US Notice of Allowance dated Mar. 11, 2010 issued in U.S. Appl. No. 11/167,655.
US Notice of Allowance dated Jul. 7, 2010 issued in U.S. Appl. No. 11/167,655.
US Notice of Allowance dated Dec. 10, 2010 issued in U.S. Appl. No. 11/167,655.
US Notice of Allowance dated Apr. 1, 2011 issued in U.S. Appl. No. 11/167,655.
Third Party Submission filed for U.S. Appl. No. 13/094,259 dated Oct. 18, 2011.
PCT International Search Report dated Apr. 9, 2008 issued in WO 2008/028153.
PCT Written Opinion dated Apr. 9, 2008 issued in WO 2008/028153.
PCT International Preliminary Report on Patentability and Written Opinion dated Mar. 3, 2009 issued in WO 2008/028153.
Australian Examiner's first report dated Jul. 25, 2011 issued in AU 2007289050.
European Examination Report dated Oct. 5, 2009 issued in EP 07 814 629.7.
PCT International Search Report dated Dec. 7, 2009 issued in WO 2010/039411.
PCT International Preliminary Report on Patentability and Written Opinion dated Jul. 17, 2006 issued in WO 2005/071629.
Australian Examiner's First Report dated Nov. 12, 2009 issued in AU2005207309.
Australian Examiner's Report No. 2 dated Sep. 15, 2010 issued in AU Application No. 2005207309..
Chinese First Office Action dated Nov. 28, 2008 issued in CN2005800022940.
Chinese Second Office Action dated Sep. 25, 2009 issued in CN2005800022940.
Chinese Third Office Action dated May 11, 2010 issued in CN2005800022940.
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
Australian Examiner's first report dated Jul. 7, 2011 issued in AU 2007319331.
EP Examination Report dated Oct. 28, 2009 issued in EP 07 845 059.0 1238.
PCT International Search Report dated May 20, 2008 issued in WO 2008/063952.
PCT International Search Report and Written Opinion dated May 20, 2008 issued in WO 2008/063952..
PCT International Preliminary Report on Patentability and Written Opinion dated May 19, 2009 issued in WO 2008/063952.
Australian Examiner's first report dated Aug. 2, 2011 issued in AU 2007323945.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.

Australian Examiner's first report dated Jul. 25, 2011 issued in AU 2007324000.
European Examination Report dated Oct. 28, 2009 issued in EP 07 844 998.0.
PCT International Search Report dated May 14, 2008 issued in WO 2008/063956.
PCT Written Opinion dated May 14, 2008 issued in WO 2008/063956.
PCT International Preliminary Report on Patentability and Written Opinion dated May 19, 2009 issued in WO 2008/063956.
Australian Examiner's First Report dated Aug. 4, 2011 issued in AU 2007323949.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19, 2009 issued in WO 2008/063908.
Australian Examiner's first report dated Jul. 25, 2011 issued in AU 2007323994.
PCT International Preliminary Report on Patentability and Written Opinion dated May 19, 2009 issued in WO 2008/079542.
Australian Examiner's first report dated Aug. 2, 2011 issued in AU 2007338512.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.
Australian Examiner's first report dated Aug. 12, 2011 issued in AU 2007323964.
European Examination Report dated Oct. 28, 2009 issued in EP 07 845 062.4.
PCT International Search Report dated Dec. 11, 2008 issued in WO 2009/039295.
PCT Written Opinion dated Dec. 11, 2008 issued in WO 2009/039295.
PCT International Preliminary Report on Patentability and Written Opinion dated Mar. 24, 2010 issued in WO 2009/039295.
PCT International Search Report dated Jul. 16, 2008 issued in WO2009/054861.
PCT Written Opinion dated Jul. 16, 2008 issued in WO2009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
Australian Examiner's first report dated Nov. 30, 2011 issued in AU2007312986.
European Examination Report dated Sep. 10, 2009 issued in EP 07 853 965.7.
PCT International Search Report dated May 20, 2008 issued in WO2008/063969.
PCT Written Opinion dated May 20, 2008 issued in WO 2008/063969.
PCT International Preliminary Report on Patentability and Written Opinion dated May 19, 2009 issued in WO 2008/063969.
Australian Examiner's first report dated Aug. 19, 2011 issued in AU2007323962.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.
Australian Examiner's first report dated Jul. 29, 2011 issued in AU 2007323961.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Jul. 10, 2007 issued in Application No. 2005-518567.
Japanese Description of Office Action (interrogation) dated May 25, 2009 issued by an Appeal Board in Application No. 2005-518567.
European Extended Search Report dated Jan. 26, 2012 issued in EP 11 17 6202.
GB Combined Search and Examination Report dated Nov. 18, 2011 issued in GB1113207.3.
Australian Examiner's First Report dated Apr. 5, 2005 issued in AU2003227286.
Australian Examination Report (as described by Applicant's Attorney) dated Feb. 26, 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
Newton, Harry, Newton's Telecom Dictionary, Jan. 1998, Telecom Books and Flatiron Publishing, p. 399.
"Pointer_Ballistics for Windows XP.pdf" (Oct. 31, 2002), Microsoft,[downloaded on Aug. 27, 2010 from http://www.microsoft.com/whdc/archive/pointer-bal.mspx], 3 pages.
Police 911, Wikipedia, Jan. 22, 2002, retrieved from Internet at http://en.wilkipedia.org/widi/Police_911 on Oct. 28, 2007, 4 pgs.
Stic Search History, Patent Literature Bibliographic Databases, Cited by Examiner in a US Office Action dated Jul. 23, 2010 issued in U.S. Appl. No. 11/938,151, 98 pages.

* cited by examiner

SEPARABLE GAME GRAPHICS ON A GAMING MACHINE

CROSS REFERENCE TO RELATED APPLICATIONS

This application claims priority under 35 U.S.C. §119(e) to U.S. Provisional Patent Application No. 60/858,741 filed on Nov. 13, 2006, which is incorporated herein by reference in its entirety for all purposes.

FIELD OF THE INVENTION

This invention relates to separable graphics. In particular, embodiments describe separable graphics for use with a layered display apparatus included in a gaming machine.

BACKGROUND

As technology in the gaming industry progresses, the traditional mechanically driven reel slot machines are being replaced by electronic machines having an LCD video display or the like. Processor-based gaming machines are becoming the norm. One reason for their increased popularity is the nearly endless variety of games that can be implemented using processor-based technology. These processor-based gaming machines enable the development and use of more complex games, incorporate player tracking, improve security, permit wireless communications, and add a host of digital features that are not possible on mechanical-driven gaming machines. The increasing cost of designing, manufacturing, and maintaining complex mechanical gaming machines has also motivated casinos and the gaming industry to abandon these older machines.

OVERVIEW

The present invention provides a gaming machine with layered displays and separable graphics that leverage the layered displays to enhance game play on a gaming machine. The separable graphics include separate but related content on each of the display panels for a game. The layered displays include a proximate screen and distal video display device that provide actual physical separation between graphics items output by proximate and distal video display devices. This distance provides parallax, which improves three-dimensional perception of video graphics and games by the gaming machine.

In one aspect, the present invention relates to a method of providing a game of chance on a gaming machine. The method includes displaying the game of chance using a proximate video display device and a distal video display device arranged along a common line of sight. The proximate video display device and the distal video display device are arranged to include a set distance between a display panel in the distal video display device and a display panel in the proximate video display device; the set distance is less than about 10 centimeters. The method also includes displaying first video data, on the proximate video display device, that includes a first video graphic for the game. The method further includes displaying second video data, on the distal video display device, that includes a second video graphic for the game. The method additionally includes displaying the game, which changes the first video graphic on the proximate video display device and changes the second video graphic on the distal video display device during the game. The method also includes providing an outcome for the game.

In another aspect, the present invention relates to logic encoded in one or more tangible media for execution and, when executed, operable to provide a game of chance on a gaming machine.

In yet another aspect, the present invention relates to a gaming machine. The gaming machine includes a cabinet defining an interior region of the gaming machine; the cabinet is adapted to house a plurality of gaming machine components within or about the interior region. The gaming machine also includes a proximate video display device and a distal video display device. The proximate video display device is disposed within or about the interior region and is configured to output a visual image in response to a control signal. The distal video display device is arranged inside the interior region relative to the first display device. A common line of sight passes through the proximate video display device to the distal video display device. The gaming machine further includes at least one processor configured to execute instructions, from memory, that a) display first video data, on the proximate video display device, that includes a first video graphic for a game, b) display second video data, on the distal video display device, that includes a second video graphic for the game, and c) display the game, which changes the first video graphic on the proximate video display device and changes the second video graphic on the distal video display device during the game.

These and other features and advantages of the invention will be described in more detail below with reference to the associated figures.

DESCRIPTION OF THE PREFERRED EMBODIMENTS

Figure 1A:
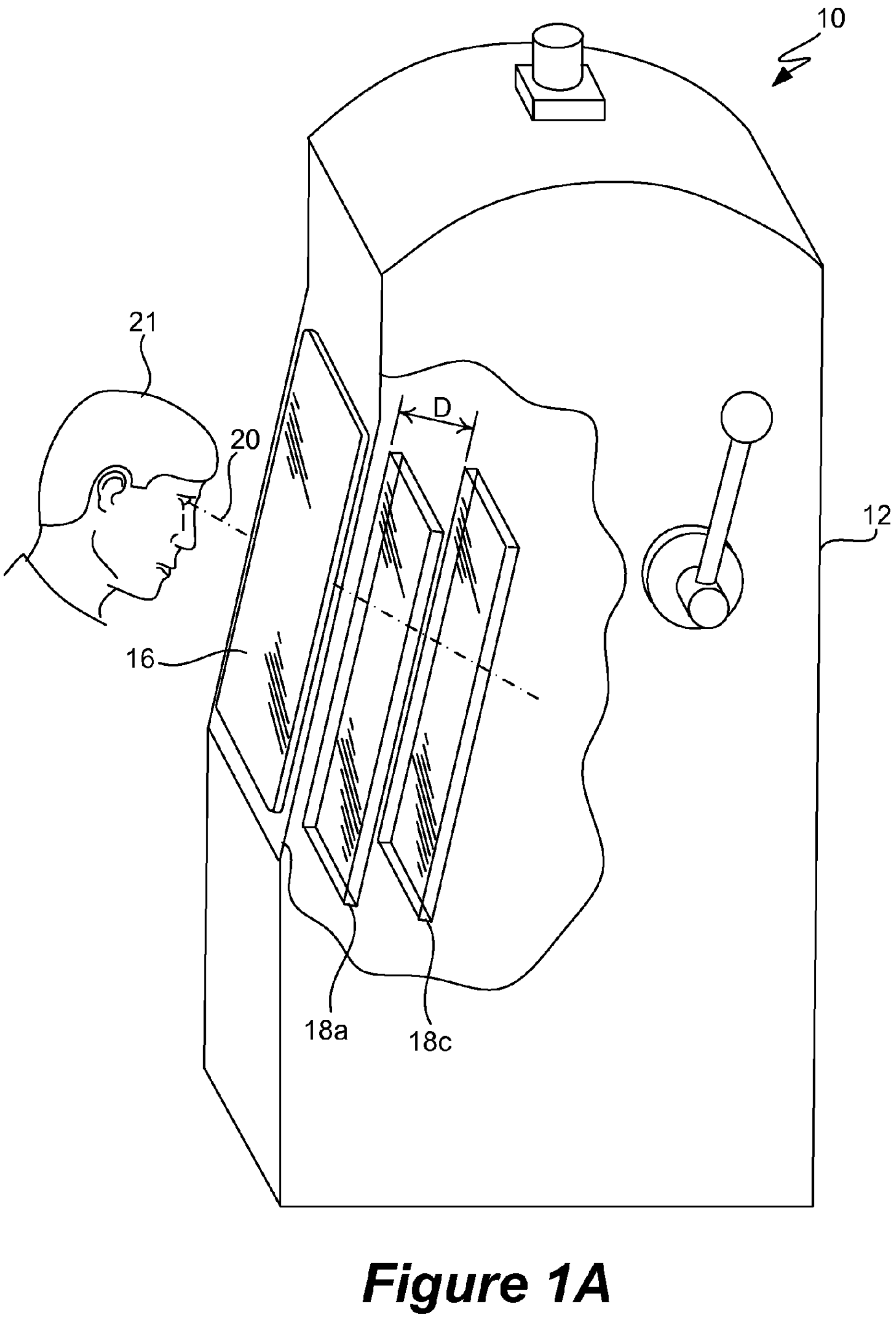
FIG. 1A shows layered displays in a gaming machine in accordance with one embodiment.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention includes a gaming machine with multiple display devices arranged in a common line of sight relative to a person near the gaming machine. The multiple video display devices each display their own separable graphics and images, and cooperate to provide coordinated visual output for a gaming machine.

Multiple video display devices disposed along a common line of sight are also referred to herein as 'layered' displays. Layered video display devices may be described according to their position along the common line of sight relative to a viewer. As the terms are used herein, 'proximate' refers to a video display device that is nearer to a person, along a common line of sight (such as 20 in FIG. 1A), than another video display device. The person is typically in front of (or near) a gaming machine. 'Distal' refers to a video display device that is farther from a person, along the common line of sight, than another. When a gaming machine includes only two layered video display devices, the front video display device is referred to herein as the proximate video display device, while the back video display device is referred to herein as the distal video display device.

Objects and graphics in a game may appear on any one or multiple of the video display devices, where graphics on the proximate screen(s) block the view objects on the distal screen(s), depending on the position of the viewer relative to the screens. One or more of the layered display devices proximate to a person (near the gaming machine) include portions that are completely or partially transparent and/or translucent so as to permit view video graphics on the distal display devices.

This multi-layer display device arrangement improves visual output for a gaming machine. As will be described below, display device arrangements described herein permit new forms of graphics presentation for a game played on a gaming machine, three-dimensional (3D) graphics with actual depth and parallax, more games to be played on a single gaming machine, and/or dynamic reconfiguration of a gaming machine to offer multiple games that traditionally required manual and mechanical reconfiguration of a gaming machine, e.g., to change the number of reels for a new reel game, switch between one video display device and multiple layered video display devices, etc.

The layered displays permit separable game graphics on a gaming machine. Many separable game graphics designs are described below with respect to FIGS. 2-7.

Player participation on a gaming machine increases with entertainment. Improved visual output provided by separable video graphics described herein enables more entertaining forms of interaction between a player and gaming machine, and thus improves player participation and patronage for a casino or gaming establishment that uses gaming machines and methods described herein.

For example, the common line of sight and layered displays improve presentation of separable 3D graphics. A gaming machine may use a combination of virtual 3D graphics on any one of the display devices—in addition to separable graphics on each of the layered video display devices. Separable in this sense refers to a first graphic for a game on a first layered video display device and a second graphic for the game on a second layered video display device—they are physically separate and on separate screens, but programmed to be perceived together. Notably, the layered video display devices provide actual 3D depth and perception using the set distances between screens. Virtual 3D graphics on a single screen may include shading, highlighting and perspective techniques that selectively position graphics in an image to create the perception of depth. These virtual 3D image techniques cause the human eye to perceive depth in an image even though there is no real depth (the images are physically displayed on a single display screen, which is relatively thin). The real distance between display screens, however, creates separable graphics having real depth between the layered display devices. 3D presentation of graphic components may then use a combination of: a) virtual 3D graphics techniques on one or more of the multiple screens and/or b) actual depths between the layered display devices. Further description of 3D graphics presentation is provided below.

The separable graphics may be static or dynamic. Static separable graphics remain on their respective screen during game play. Dynamic separable graphics move between screens during game play. Examples of each of these types of separable graphics are described below.

In another specific embodiment, the multiple video display devices output video for different games or purposes. For example, a distal video display device may output a reel game, while an intermediate video display device outputs a bonus game or pay table associated with the distal video display device, while a proximate and foremost video display device provides a progressive game or is reserved for player interaction and video output with a touchscreen. Other layered video display device combinations and configurations may be used.

Layered video display devices will first be described. In one embodiment, the gaming machine includes two layered display devices, including a proximate, foremost or exterior video display device and a distal, underlying or interior video display device. For example, the proximate video display device may include a transparent LCD panel while the distal video display device includes a second LCD panel.

As the term is used herein, a video display device refers to any device configured to output video graphics and a visual image in response to a control signal. In one embodiment, the display device includes a screen of a finite thickness, also referred to herein as a display screen. For example, LCD video display devices often include a flat panel that includes a series of layers, one of which includes a layer of pixilated light transmission elements for selectively filtering red, green and blue data from a white light source. Each video display device is adapted to receive signals from a processor, video processor or controller included in the gaming machine and to generate and present video graphics and images to a person near the gaming machine. The format of the signal will depend on the video device, as one of skill in the art will appreciate. In one embodiment, all the video display devices in a layered arrangement respond to digital signals. For example, the red, green and blue pixilated light transmission elements for an LCD device typically respond to digital control signals to generate colored light, as desired.

Figure 1B:
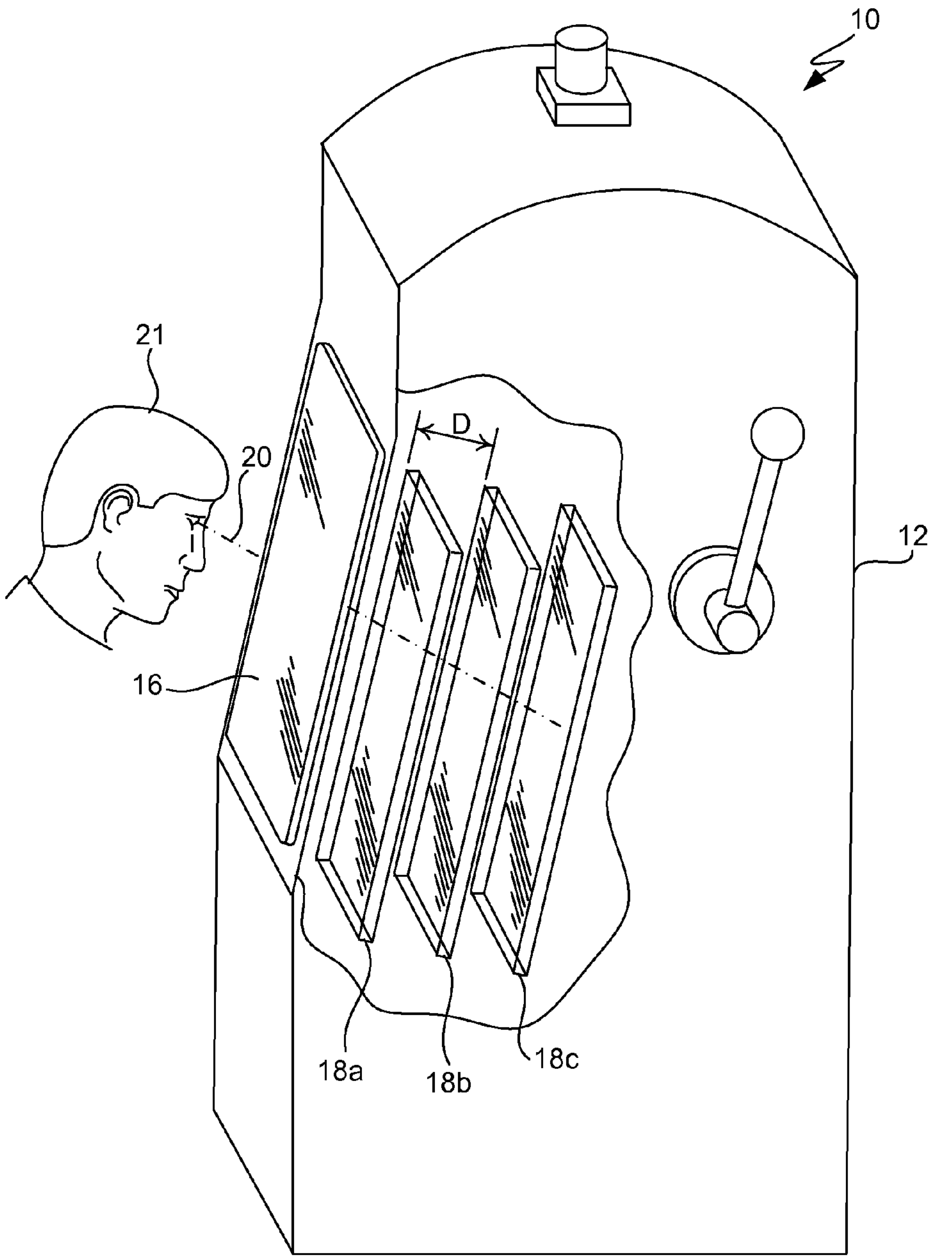
FIG. 1B shows layered displays in a gaming machine in accordance with another embodiment.

Referring primarily now to FIGS. 1A and 1B, a gaming machine 10 of a specific embodiment with layered displays includes a cabinet or housing 12 that houses exterior video display device 18*a*, intermediate video display device 18*b* (FIG. 1B only), interior video display device 18*c* and a touchscreen 16. While the layered displays of FIGS. 1A and 1B are shown set back from touchscreen 16, this is for illustrative purposes and the exterior display device 18*a* may be closer to touchscreen 16.

Figure 9:
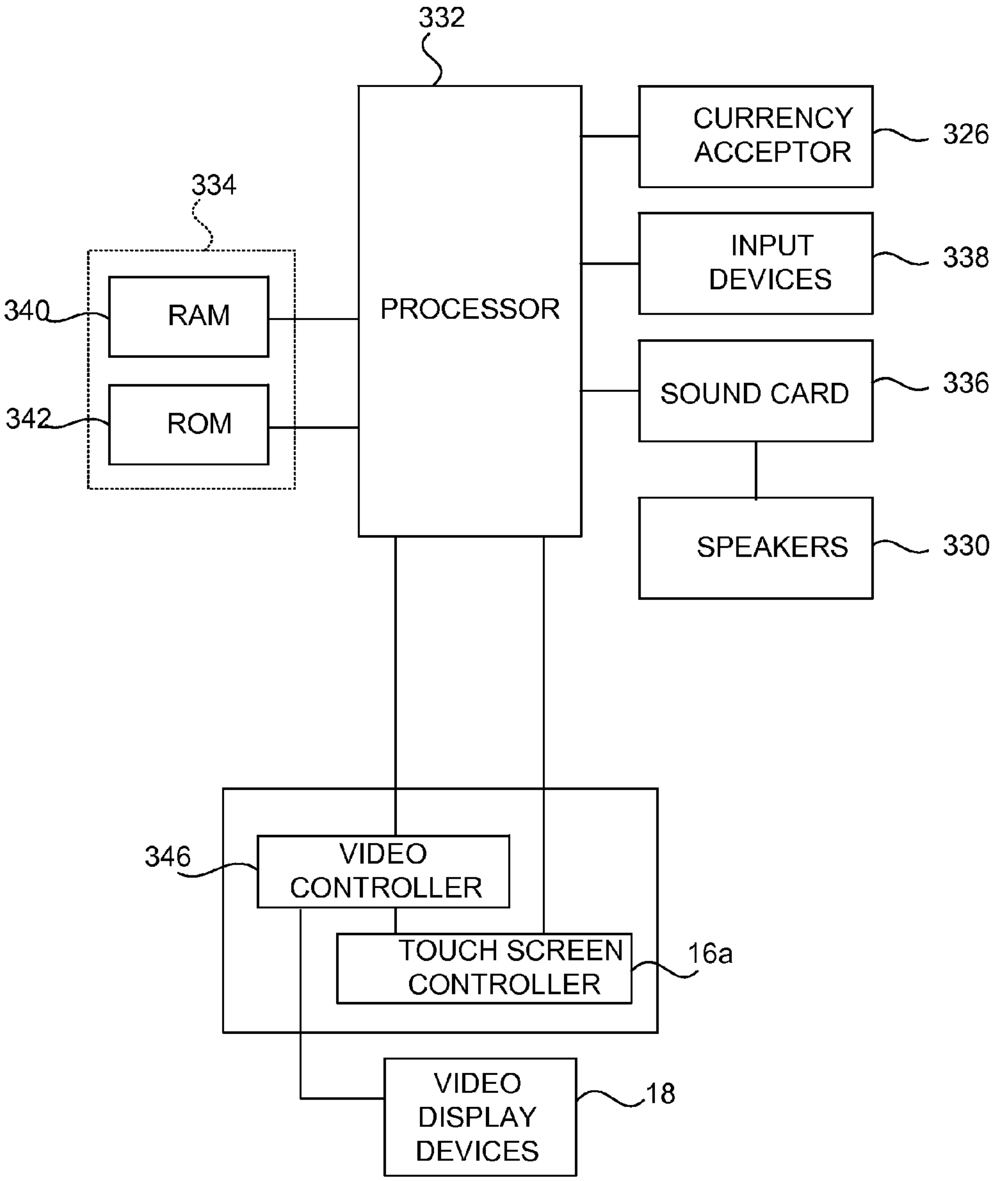
FIG. 9 illustrates a control configuration for use in a gaming machine in accordance with another specific embodiment.

Referring to FIGS. 1A, 1B and 9, layered video display devices and their operation will be briefly described. Processor 332 controls the operation of components in gaming machine 10 to present one or more games, receive player inputs using the touchscreen 16, and control other gaming interactions between the gaming machine and a person 21. Under the control of processor 332, video display devices 18 generate visual graphics for game play by a person 21. FIG. 1A shows two layered video display devices 18: a first, exterior or frontmost d video display device 18*a*, and a backmost display screen 18*c*. FIG. 1B shows three layered display devices 18: frontmost video display device 18*a*, a second or intermediate video display device 18*b*, and a backmost video display device 18*c*. The video display devices 18*a*, 18*b* and 18*c* are mounted and oriented within the cabinet 12 in such a manner that a straight and common line of sight 20 intersects the display screens of all three video display devices 18*a*, 18*b* and 18*c*. In addition, display devices 18*a*, 18*b* and 18*c* are all relatively flat and aligned about parallel to provide a plurality of common lines of sight that intersect screens for all three.

Gaming machine 10 may also include one or more light sources. In one embodiment, layered display devices 18 include LCD panels and at least one light source that provides light, such as white light, to the pixilated filter elements on each LCD panel. For example, a back lighting source (not shown) may be positioned behind display device 18*c*. The pixilated panel for each parallel display device 18*a*, 18*b* and 18*c* then filters white light from the backmost backlight to controllably output color images on each screen.

Other light sources may be used to illuminate a reflective or transmissive light filter. For example, each video display device 18 may be individually illuminated using a white light source attached near the sides (top, bottom, left, and/or right) of each pixelating panel; the side light source may include a mini-fluorescence source and light guide that transmits light from the side light source, down the flat panel, and to all the pixilated filter elements in the planar LCD panel for pixilated image production. Other suitable light sources may include cold cathode fluorescent light sources (CCFLs) and/or light emitting diodes, for example.

In another embodiment, a distal and emissive display device is arranged behind a proximate and non-emissive display device, and provides light to the proximate display device, which then filters the light to create an image. For example, a flat OLED, electroluminescent, or plasma display device 18*c* may be used to a) produce an image and b) to emit light that is filtered by LCD panels 18*a* and 18*b*. In this case, the distal and emissive display device emits at least some white light. For example, video output of one or more reels may include significant white light that is also used to illuminate one or more LCD panels for pixilated filtering. In another embodiment, the proximate LCD panels use reflective light where the light comes from in front of the gaming machine, e.g., from the ambient room.

The proximate video display devices 18*a* and 18*b* each have the capacity to be partially or completely transparent or translucent. In a specific embodiment, the relatively flat and thin video display devices 18*a* and 18*b* are liquid crystal display devices (LCDs). Other video display technologies are also suitable for use. Various companies have developed relatively flat video display devices that have the capacity to be transparent or translucent. One such company is Uni-Pixel Displays, Inc., Inc. of Houston Tex., which sells display screens that employ time multiplex optical shutter (TMOS) technology. This TMOS display technology includes: (a) selectively controlled pixels that shutter light out of a light guidance substrate by violating the light guidance conditions of the substrate and (b) a system for repeatedly causing such violation in a time multiplex fashion. The display screens that embody TMOS technology are inherently transparent and they can be switched to display colors in any pixel area. A transparent OLED may also be used. An electroluminescent display is also suitable for use with proximate display devices 18*a* and 18*b*. Also, Planar Systems Inc. of Beaverton Oreg. and Samsung of Korea, both produce several display devices that are suitable for use herein and that can be translucent or transparent. Kent Displays Inc. of Kent Ohio also produces Cholesteric LCD display devices that operate as a light valve and/or a monochrome LCD panel.

Figure 1C:
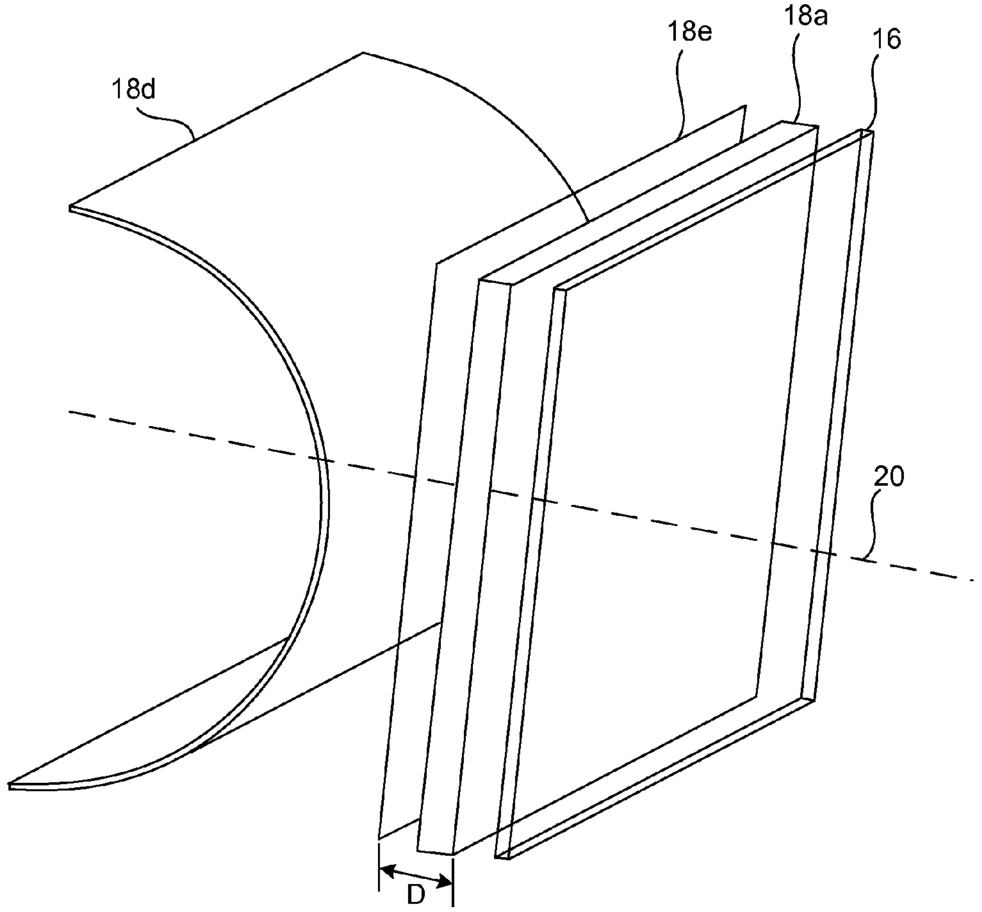
FIG. 1C shows another layered video display device arrangement in accordance with a specific embodiment.

FIG. 1C shows another layered video display device arrangement in accordance with a specific embodiment. In this arrangement, a touchscreen 16 is arranged in front of an exterior LCD panel 18*a*, an intermediate light valve 18*e* and a curved display device 18*d*.

A common line of sight 20 passes through all four layered video display devices. As the term is used herein, a common line of sight refers to a straight line that intersects a portion of each display device. The line of sight is a geometric construct used herein for describing a spatial arrangement of display devices. If all the proximate video display devices are transparent along the line of sight, then a person should be able see through all the video display devices along the line of sight. Multiple lines of sight may also be present in many instances.

Light valve 18*e* selectively permits light to pass therethrough in response to a control signal. Various devices may be utilized for the light valve 18*e*, including, but not limited to, suspended particle devices (SPD), Cholesteric LCD devices, electrochromic devices, polymer dispersed liquid crystal (PDLC) devices, etc. Light valve 18*e* switches between being transparent, and being opaque (or translucent), depending on a received control signal. For example, SPDs and PDLC devices become transparent when a current is applied and become opaque or translucent when little or no current is applied. On the other hand, electrochromic devices become opaque when a current is applied and transparent when little or no current is applied. Additionally, light valve 18*e* may attain varying levels of translucency and opaqueness. For example, while a PDLC device is generally either transparent or opaque, suspended particle devices and electrochromic devices allow for varying degrees of transparency, opaqueness or translucency, depending on the applied current level.

In one embodiment, the gaming machine includes a touchscreen 16 disposed outside the exterior video display device 18*a*. Touchscreen 16 detects and senses pressure, and in some cases varying degrees of pressure, applied by a person to the touchscreen 16. Touchscreen 16 may include a capacitive, resistive, acoustic or other pressure sensitive technology. Electrical communication between touchscreen 16 and the gaming machine processor enable the processor to detect a player pressing on an area of the display screen (and, for some touchscreens, how hard a player is pushing on a particular area of the display screen). Using one or more programs stored within memory of the gaming machine, the processor enables a player to activate game elements or functions by applying pressure to certain portions of touchscreen 16. Several vendors known to those of skill in the art produce a touchscreen suitable for use with a gaming machine. Additionally, touchscreen technology which uses infrared or other optical sensing methods to detect screen contact in lieu of pressure sensing may be employed, such as the proprietary technology developed by NextWindow Ltd. of Aukland, New Zealand.

Rear video display device 18*d* includes a digital video display device with a curved surface. A digital video display device refers to a video display device that is configured to receive and respond to a digital communication, e.g., from a processor or video card. Thus, OLED, LCD and projection type (LCD or DMD) devices are all examples of suitable digital display devices. E Ink Corporation of Cambridge Mass. produces electronic ink displays that are suitable for use in rear video display device 18*d*. Microscale container display devices, such as those produced SiPix of Fremont Calif., are also suitable for use in rear video display device 18*d*. Several other suitable digital display devices are provided below.

Figure 5A:
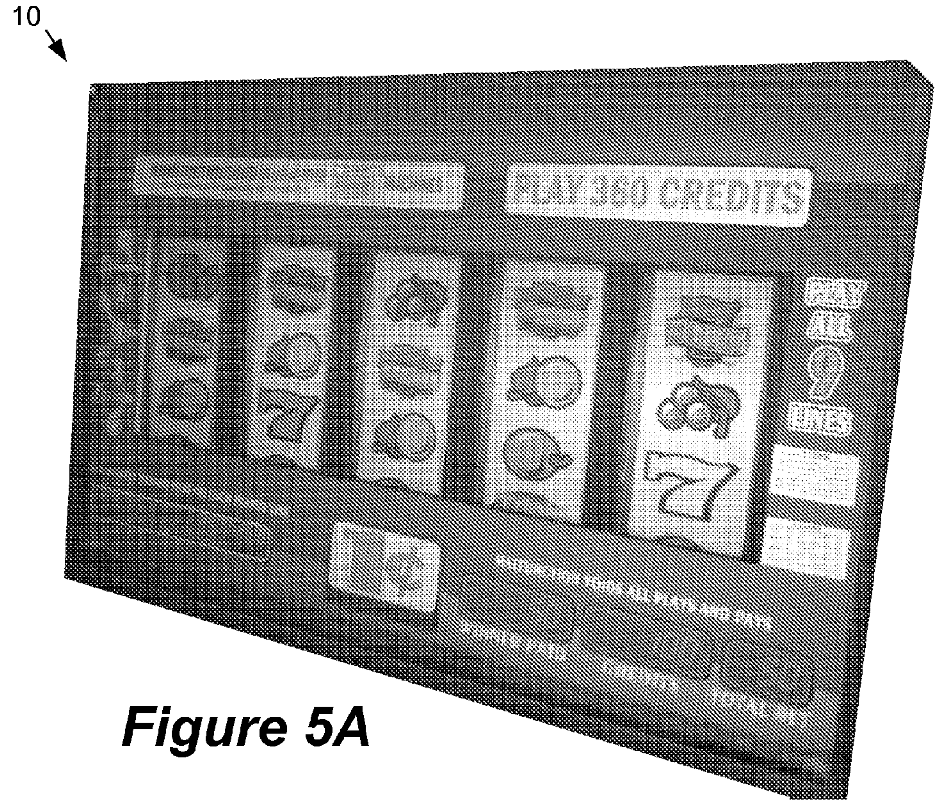
FIG. 5A shows video output on layered displays and configured to realistically simulate mechanical reels in accordance with one embodiment.
Figure 5B:
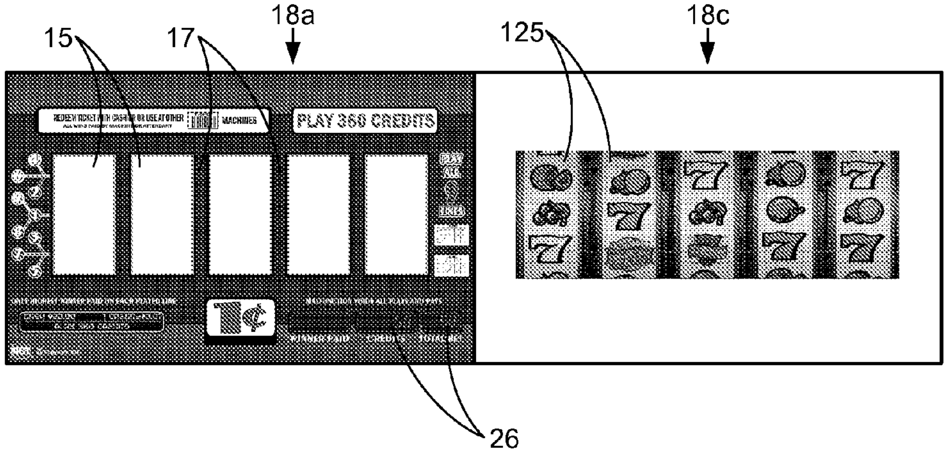
FIG. 5B shows the video output of FIG. 5A separated into front and back video for display on front and back displays, respectively, in accordance with one embodiment.

Pixilated element panels on many non-emissive displays such as LCD panels are largely invisible to a viewer. More specifically, many display technologies, such as electroluminescent displays and LCD panels, include portions that are transparent when no video images are displayed thereon. An electroluminescent display may utilize non-organic phosphors that are both transparent and emissive (such as a tOLED), and addressed through transparent row and column drivers. Pixilated element panels on LCD panels are also available in significantly transparent or translucent designs that permit a person to see through the pixilated panels when not locally displaying an image. FIGS. 5A and 5B show sample window portions 15 of proximate display device 18*a* that are transparent. The window portions 15 may be any suitable shape and size and are not limited to the sizes and arrangements shown.

If used, corresponding portions of touchscreen 16 and light valve 18*e* along the lines of sight for portions 15 are also translucent or transparent, or alternatively have the capacity to be translucent or transparent in response to control signals from a processor included in the gaming machine. When portions (or all) of the screens for touchscreen 16, video display devices 18*a* and 18*b*, and light valve 18*e* are transparent or translucent, a player can simultaneously see images displayed on the display screen 18*a* (and/or 18*b*)—as well as the images displayed on the interior display devices 18*c*—by looking through the transparent portions 15 of proximate display devices.

In another embodiment, the layered video display devices in a gaming machine include a design or commercially available unit from Pure Depth of Redwood City, Calif. The Pure Depth technology incorporates two or more LCD displays into a physical unit, where each LCD display is separately addressable to provide separate or coordinated images between the LCDs. Many Pure Depth display systems include a high-brightened backlight, a rear image panel, such an active matrix color LCD, a diffuser, a refractor, and a front image plane; these devices are arranged to form a stack. The LCDs in these units are stacked at set distances.

Additional planar elements may be interposed between the proximate and distal display devices. These elements may consist of various films and/or filters that alter the optical characteristics of light, after passing through the distal transmissive video display device, and before it reaches a rear surface of the proximate transmissive video display device. The digital nature of a display panel decomposes an analog image into a series of discrete colored picture elements, known as “pixels”, which normally combine seamlessly and are interpreted by the eye as equivalent of their analog original format. However, when more than one digital image is disposed along a common line of sight, undesired visual artifacts may result from the alignment of the pixels in the digital images—since one panel is essentially viewed through the other. A change in either of the images or in the viewing position may create an interference pattern which may appear as a moving or strobing effect on the images and, in many cases, may degrade them. One such effect, known as moiré, is very similar to the interference effects produced by multiple transmissive digital display devices.

To reduce visual effects attributable to layered digital transmissive digital video display devices, interstitial elements may be placed between the devices to diminish the digital nature of the image output by a distal display. By partially obscuring the individual pixels and blending them into a more analog-like visual image, the potential for undesired visual interference patterns may be reduced to an imperceptible level. Further, other optical properties, including but not limited to the polarization and color balance of the light passing between the transmissive digital display devices, may be controlled using a film or panel disposed within the gap between display devices.

Although the examples described herein display systems that include layered video display devices for a primary display located centrally in a gaming machine, those of skill in the art will recognize that display systems described herein are applicable towards other areas of a gaming machine, such as a top glass or a belly glass.

The layered video display devices 18 may be used in a variety of manners to output video graphics and games on a gaming machine. In one embodiment, the video graphics are separable, which means that video output for a game is programmed to co-act and use multiple video display devices 18 for game output. In some cases, video data and images displayed on video display devices 18*a* and 18*c* are positioned such that the graphics do not overlap (that is, the graphics on separate layers are not superimposed). In other instances, the graphics partially overlap.

Separable video graphics suitable for use with gaming machine 10 will now be discussed with respect to FIGS. 2-7. While the present invention will now be shown as graphics for display on a video device, those of skill in the art will appreciate that the following discussion and Figures also refer to methods and systems for providing a game of chance and providing video data on a gaming machine.

The layered video display devices cooperate to provide visual presentation by each displaying their own separable graphics. For 3D visual presentations, the video display devices cooperate to display a 3D visual presentation by separately displaying parts on each display screen. For example, a proximate video display device shows one portion of the 3D presentation, while a distal or underlying video display device shows another portion of the 3D presentation. As result, the gaming machine shows a 3D representation that is formed in three physical or actual dimensions: an x and y of the proximate display screen, an x and y of the distal display screen, and a depth, D, or z dimension that includes the actual distance between the two display devices. A third display device may be used to add another set of x and y dimensions and another depth, D, along the z dimension.

Figure 2A:
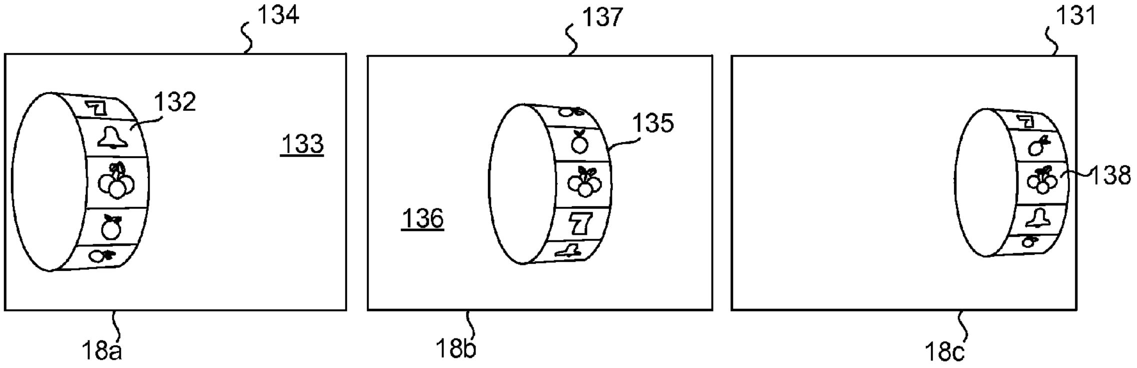
FIGS. 2A and 2B show sample video graphics output on layered display devices in accordance with a specific embodiment.
Figure 2B:
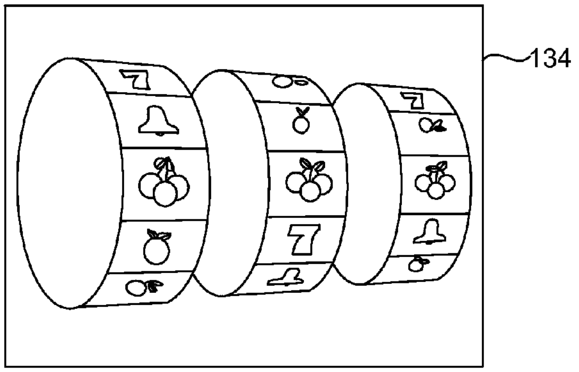

FIGS. 2A and 2B show sample video graphics output on three approximately parallel layered video display devices 18 in accordance with a specific embodiment. The three layered video display devices 18 include: an exterior or frontmost display device 18*a*, a middle or intermediate video display device 18*b*, and an interior or backmost video display device 18*c*. The frontmost video display device 18*a* displays a left virtual 3D reel graphic 132 on a portion of its display screen 134. All other portions 133 of screen 134 are transparent so that a user can see distal screens for video display devices 18*b* and 18*c*. The intermediate video display device 18*b* shows a middle virtual 3D reel graphic 135 in a central portion of its display screen 136, while all other portions 137 of screen 136 are transparent. The third video display device 18*c* displays a right virtual 3D reel graphic 138 on screen 131. These three display screens 134, 137 and 131 simultaneously display each respective image to enable a player to see an overall 3D image, as illustrated in the FIG. 2B (illustrated in two dimensions, that is), of all three reels in a 3D format by looking through the first display screen 134.

The video reels shown in FIGS. 2A and 2B are static and remain on their respective screens during game play. This provides parallax between the video graphics, which is an actual 3D effect. Parallax refers to the change of angular position between two stationary points relative to each other as seen by an observer and caused by motion of the observer. In other words, it is a perceived shift of an object relative to another object caused by a change in observer position. If there is no parallax between the two objects, then a person typically perceives them as side by side at the same depth. This addition of parallax helps the processor-based gaming machine better emulate the three dimensional nature of mechanical counterparts.

Figure 3:
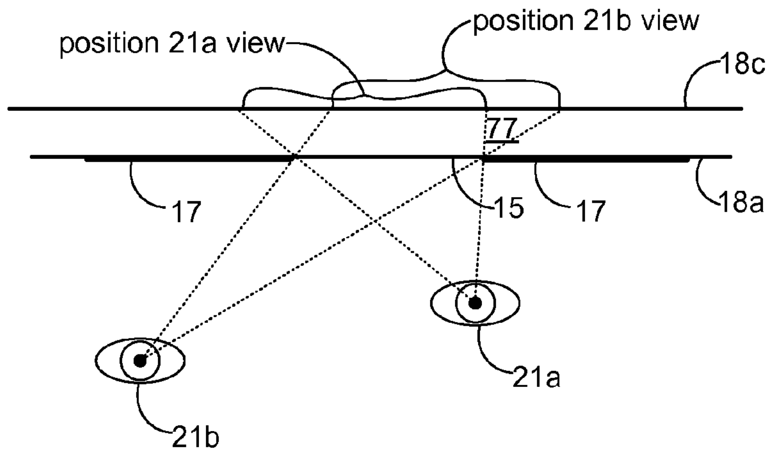
FIG. 3 illustrates parallax for a gaming machine with layered displays and separable video graphics.

FIG. 3 illustrates parallax for a gaming machine with layered displays and separable video graphics. Typically, video graphics provided to the front video display device 18*a* include one or more non-transparent (opaque or translucent) portions 17 to establish the parallax. When in position 21*a*, a blind spot 77 spot results from a non-transparent portion 17 of video data on the proximate video display device 18*a* that blocks a portion of the person's field of view. A change in viewing position to 21*b* also changes obstruction based on the relative position between person 21, the non-transparent portions 17, and video data on the video distal display device 18*b*, thus hiding formerly visible portions of distal display device—and revealing other portions (e.g., part of blind spot 77) blocked from view in the previous position 21*a*.

This parallax stems from the distance between screens in the layered displays. Referring back to FIGS. 1A and 1B, a predetermined spatial distance "D" separates display screens for the layered display devices 18*a* and 18*c*. The predetermined distance, D, represents the distance from the display surface of display device 18*a* to display surface of display device 18*b* (FIG. 1B) or display device 18*c* (FIG. 1A). In one embodiment, the display screens are positioned adjacent to each other such that only a thickness of the display screens separates the display surfaces. In this case, the distance D depends on the thickness of the exterior display screen. In a specific embodiment, distance "D" is selected to minimize spatial perception of interference patterns between the screens. In one embodiment, D is greater than about 1 millimeter and less than about 10 centimeters. In a specific embodiment, D is less than about 1 centimeter. In another specific embodiment, D is between about 4 millimeters and about 1 centimeter. Other set distances may be used.

Returning to FIGS. 2A and 2B, the video reels on the layered displays add 3D parallax to the visual display of static and separable graphics on a gaming machine. When a person moves relative to the video reels 132, 135 and 138, lines of sight though the screens change, which changes the portions of screens 137 and 131 that are visible. This grants true parallax and three-dimensional depth perception. For FIG. 2B, a person may peek behind left video reel 132, move relative to the reels and peer between them, etc.

The reels in each screen also include 3D graphics within each screen. Virtual 3D graphics on a single screen typically involve shading, highlighting and perspective techniques that selectively position and shape video graphics in an image to create the perception of depth. These virtual 3D image techniques cause the human eye to perceive depth in an image even though there is no real depth (the images are physically displayed on a single display screen, which is relatively thin).

In one embodiment, the 3D separable video graphics include video data with perspective. Perspective, in the context of vision and visual perception, is the way in which objects appear to the eye based on their spatial attributes, or their dimensions and the position of the eye relative to the objects. Perspective states that the position of a person relative to a gaming machine affects what the person sees. Two common examples of perspective include: 1) objects are drawn smaller as their distance from the observer increases; and 2) the distortion of items when viewed at an angle (spatial foreshortening). Other characteristics of perspective are also suitable for use.

In one embodiment, a gaming machine adds perspective by displaying video data that includes perspective. The perspective video data provides an approximate representation, on a flat surface (such as a video screen for display device 18*c*), of an image as it is perceived by the eye in three dimensions. The perspective video data may then be augmented by the parallax gained by the layered displays 18.

A person standing in front of a gaming machine and looking normal to a traditional mechanical reel benefits from depth perception of the three dimensional curved reel. As a result, an actual mechanical reel is often perceived with a slight bi-concave shape on its lateral edges. In a specific embodiment, a video reel includes a slight outward bowing of the lateral sides of the video reel to better simulate its mechanical counterpart. This outward bowing is only slightly done; this effect is also included in the video data of reels 125 of FIGS. 5A-5E.

The video graphics may also include simulated perspective in the reel symbols. In a specific embodiment, shape of a video symbol on a video reel strip depends on its rotational position on video reel. For example, a lower edge of a symbol, located at the uppermost portion of reel strip is closer to a person standing in front of the gaming machine and more normal to the person's view than the upper edge of the symbol. Correspondingly, the lower edge of symbol appears slightly larger to the player than the upper edge, which is farther away. Re-creating this effect in a video simulation may be accomplished by introducing a measure of "keystoning" to the symbols.

Layered display devices thus permit both virtual 3D graphics (created within a single screen, e.g., perspective) and actual 3D graphics (created between screens, e.g., parallax). More specifically, each screen permits 3D graphics rendering on that screen to create virtual effects of perceived depth. Also, each display device provides a viewing surface or face—with an actual and different depth along the common line of sight relative to a viewer.

Characterization of 3D separable video graphics may vary. The 3D presentation may include actual 3D space characterizations, such as x, y and z coordinates. In a specific embodiment, the z-dimension refers to the depth or distance that separates screens for the layered displays, and is measured along the common line of sight between multiple video display devices. Images created on the multiple video displays may thus have an actual and physical depth dimension. For 3D graphics rendering, this permits graphics with a width, height and (virtual and/or actual) depth.

In one embodiment, each of the display devices 18 shows separable virtual 3D graphics, and controls the perception of depth in each screen. This permits collective 3D images provided by the multiple display devices to cause a player to perceive a depth that is based or derived from a combination of virtual depth and the actual depth, D. For example, a gaming machine processor may use or multiply the actual depth, D, by a factor to generate a perceived depth in rendered 3D images for each of the screens that cooperates with the actual depth, D. This permits a game designer to change the perceived depth of the entire 3D image by manipulating the virtual depth to thereby modify the perceived combination of virtual and actual depths.

Figure 4A:
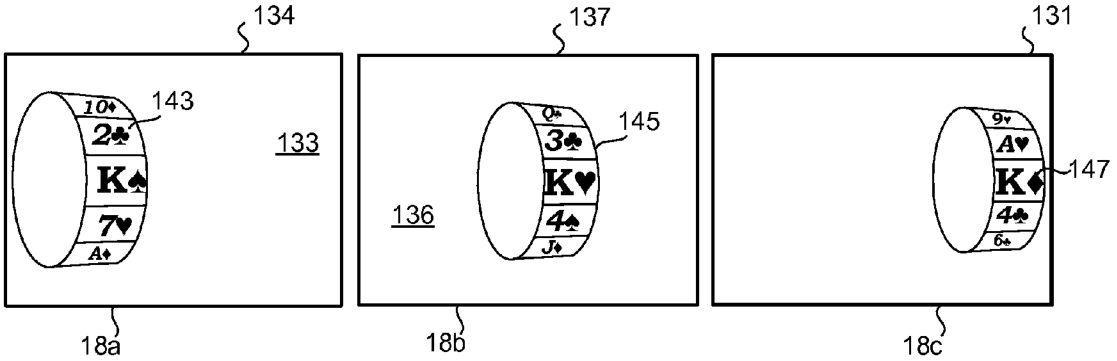
FIGS. 4A and 4B show sample reel and poker video game output on layered display devices in accordance with a specific embodiment.
Figure 4B:
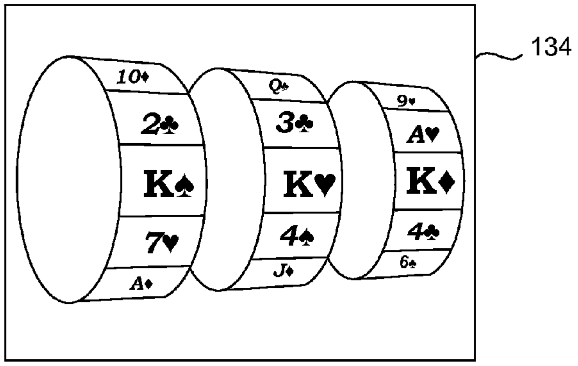

Other video graphics and games may be displayed. FIGS. 4A and 4B show sample reel and poker video game output on layered display devices 18. Frontmost video display device **18*a* displays a left virtual 3D video reel 143 with poker card values. All other portions 133 of screen 134 are translucent. The intermediate video display device 18*b* shows a middle virtual 3D video reel 145 on display screen 136, while all other portions 137 of screen 136 are transparent. As will be discussed in further detail below, a distal screen 136 may also include a transparent portion that spatially shadows video reel 143 of screen 134 when the layered display uses a backlight whose light passes through a distal screen to reach a proximate screen. The third display device 18*c* displays a right virtual 3D video reel 147 with poker card values, and may include a background image (not shown) covering the portions of its screen 131 outside video reel 147. In addition, distal screen 131 may also include transparent portions that spatially overlap video reel 143 of screen 134 and video reel 145 on display screen 136, to let light through to the proximate screens from a distal light source. Display screens 134, 137 and 131 simultaneously display each respective poker reel image to enable a player to see an overall 3D image, as illustrated in the FIG. 4B, for a 3-card poker game. Reels 143, 145 and 147** are coordinated between the screens to include a common perspective that accounts for the distances between screens.

In general, reel games output by the video display devices may include any video game that portrays one or more reels. During game play, the gaming machine simulates 'spinning' of the video reels using motion graphics for the symbols on the reel strips and motion graphics for the mechanical components.

In one embodiment, the video graphics realistically simulate mechanical reels. FIG. 5A shows video output on layered video display devices and configured to realistically simulate mechanical reels in accordance with another embodiment. FIG. 5B shows the video output of FIG. 5A separated into front and back video output, and for provision to front and back layered displays, in accordance with one embodiment.

Figure 5C:
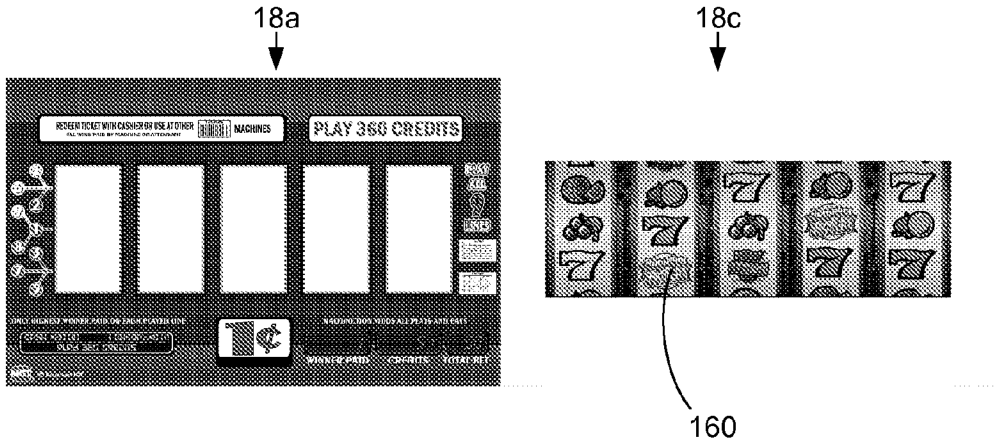
FIGS. 5C-5E show dynamic graphics for a reel game according to a win in accordance with a specific embodiment.
Figure 5D:
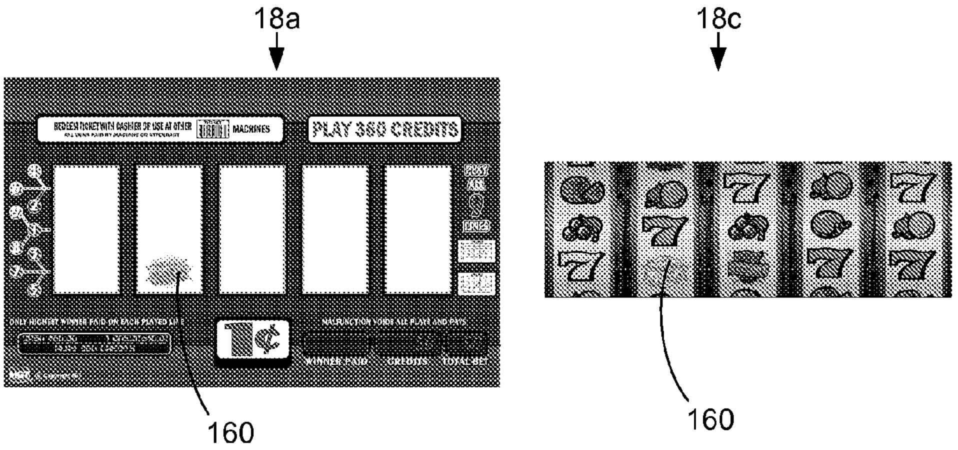
Figure 5E:
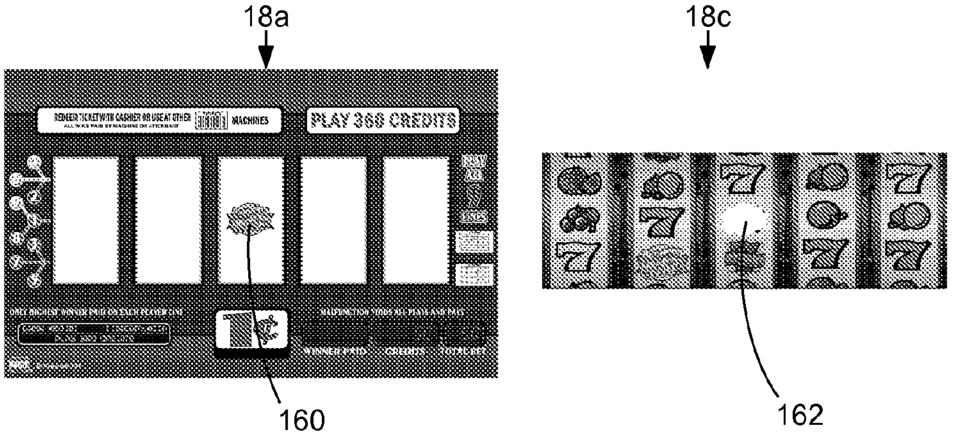

As shown in FIGS. 5A and 5B, the layered video display devices and separable video graphics presented on the layered displays are configured to resemble a traditional mechanical slot machine—both a) spatially and b) using separable video graphics provided to front video display device **18*a* and video graphics provided to rear video display device 18*c*. In this case, as shown in FIG. 5B, front video display device 18*a* initially outputs video data that resembles a silk-screened glass, while rear video display device 18*c* displays five video reels 125 that simulate and resemble traditional mechanical reels. Reels 125 "spin" during game play using changing video data provided to rear display device 18*c*. FIGS. 5C-5E, which will be described in further detail below, describe dynamic video graphics that move between the video display devices 18*a* and 18*b***.

In this case, proximate display device **18*a* displays video graphics that mimics information printed or otherwise disposed (e.g., silkscreened) on a glass layer disposed in front of mechanical reels in a traditional mechanical machine. These video graphics may include any information shown a tradition silkscreen. To increase realism, the video information may also include glare lines and other depictions interaction of the silkscreen with an environment around a gaming machine. Additionally, heat, airborne contaminants including dust and smoke residue, and natural aging effects causes discoloration of portions of a traditional glass panel display, particularly to silkscreens or stickers placed on its inside surface. These effects may also be simulated in video. Video graphics for the stickers may also include video fraying and video discoloration (e.g., dirt that simulates age) to enhance the realistic simulation of a gaming machine with a traditional glass panel display. Unlike a traditional glass layer embodiment, however, video display device 18*a*** permits displayed graphics to be changed by a gaming establishment, e.g., as desired to update, modify, or even animate the information.

Proximate video display devices display device **18*a* may include other video graphics that resemble one or more secondary displays located within or about the glass layer of a traditional mechanical gaming machine. The secondary displays often include one or more electronic displays, e.g., multi-segment LED, LCD, "Nixie tube", or other devices that provide numeric display. The video data on display device 18*a* may then simulate these devices 26**, and convey the information typically displayed with them such as: a number of credits on account, a number of credits wagered on in a particular reel spin, a number of credits won on the previous reel spin, etc.

Proximate video display device **18*a* includes transparent video window portions 15 that permit viewing of the virtual slot reels 125 that are shown on the distal display device 18*c*. Transparent video window portions 15 may include portions of a transmissive LCD driven to indicate the color white (maximum available intensity of all colors). Video data provided to displays 18*a* and 18*c* is spatially configured such that a common line of sight passes through each video window portion 15 of proximate video device 18*a* to a video reel 125 of distal video display device 18*c*. Typically, as shown in FIG. 5B, each video reel 125 is positioned on distal video display device 18*c* such that it is centered within a transparent video window portion 15**. This essentially duplicates the transparent windows present in a traditional fixed glass layer through which mechanical reels are viewed.

While a fixed glass is essentially transparent and attenuates only a negligible amount of the light passing through, the transmissive window portions 15 created in video display device **18*a* device reduce the intensity of light passing therethrough to a greater degree due to the optical composition and constraints of transmissive displays. The consequences of this effect may be reduced by increasing the intensity of light incident upon the rear surface of the panel for video display device 18*a* so that the transmissive window portions 15** are perceived to be essentially transparent to a person.

Other peripheral portions of the proximate video display device **18*a* show a pay table, metering data including wager and credit information, and other game relevant information, such as whether a bonus game or progressive game is available. Unlike a traditional mechanical machine where the silkscreen information is relatively permanent, this game relevant information may be changed by simply changing the video data provided to proximate video display device 18***a*.

As with a traditional mechanical reel apparatus, changes in player position will change the visible portions of video data shown on distal video display device 18*c* when viewed through a transparent window 15 on proximate video display device 18*a*. This provides a degree of parallax which is unavailable with only one display device. For example, the physical separation of display devices 18*a* and 18*c* provides a degree of parallax which, among other things, allows an observer to peek underneath the edges of the windows 15 and bars 17, as one might do in a traditional mechanical machine with mechanical reels.

Realistic video data provided to the layered video display devices 18 enhances the parallax—and improves the emulation of a real reel gaming machine. The video data includes multiple video data adaptations to the video reels that each simulates a realistic visual attribute of a real mechanical reel in a gaming machine. Depending on the current position of a person standing in front of gaming machine 10, a person may see video data that simulates: a hardware reel that each reel strip appears to attach to, a rotary axis or mechanism that each hardware reel appears to rotate about, a latching mechanism that appears to stop each hardware reel from rotating, along with other simulated internal mechanical components often found in a real mechanical reel gaming machine. Other realistic video data may be added to further increase the illusion of a mechanical gaming machine.

Old mechanical reel-based gaming machines have numerous mechanical attributes—such as mechanical parts and components, 3-D features, and imperfections—that are perceivable and convey their identity. Emulating these mechanical attributes can lead to the perception of real mechanical machine by a person who is near a processor-based machine. Realistic simulation of mechanical reels refers to 2-D and/or 3-D hardware and/or software attempts to emulate actual mechanical reels. The simulation goal is to have a player perceive a real mechanical reel, at least partially. The gaming machine may include a combination of video adaptations, audio adaptations and/or physical adaptations, where each adaptation adds to the perception of a mechanically driven reel slot machine.

Audio adaptations may include: stereo audio that varies output audio based on video reel position in the gaming machine (e.g., audio for a left video reel is output and increasingly heard on a left side of a digital machine, while audio for a right video reel is increasingly heard on the right side of the machine), stereo recording and playback of actual mechanical sounds in a real mechanical reel machine, randomization of the actual mechanical sounds to avoid repetition of the same sounds, etc. Other audio adaptations are also suitable for use.

Video graphics may also be used to add to the perception of real reels. FIG. 5A shows one suitable example of video graphics that provide this realistic emulation. The video graphics embodiments simulate one or more perceived realistic visual attributes of a real mechanical reel in a gaming machine. Briefly, these perceived realistic visual attributes may include one or more of: outward bowing of video reel edges to simulate perceived curvature of an actual circular mechanical reel, variable lighting of video reel displays to simulate perceived reel curvature and out of plane dimensions of an actual curved reel, the inclusion of video simulations of mechanical components between the reel strips (e.g., latches and other mechanisms that a person can see in a mechanical reel gaming machine), backlight blinking of video reel symbols to simulate lighting used in old-fashioned mechanical systems, etc.

In another specific embodiment, video data provided to the distal video device simulates a visible mechanical imperfection of a mechanical reel in a gaming machine. The visible mechanical imperfection refers to visible actions, attributes or behavior of a mechanical reel or one or more parts in a mechanical reel or gaming machine. The visible mechanical imperfection may be dynamic, meaning that the mechanical reel is moving when it displays the visible imperfection. Genesis for the visible imperfection often stems from peculiarities, realities or imperfections in the mechanical device or system, such as loose machining tolerances, random variation of real systems, etc. For example, a video reel may wobble or show lateral jitter in a direction orthogonal to the direction of spin to emulate this common occurrence in a real mechanical reel system. In another specific embodiment, the visible mechanical imperfection includes video reel kick-back, which emulates the dynamic bounce that a real mechanical reel commonly produces when stopped. Video reels may also spin at slightly different speeds to emulate their imperfect mechanical counterparts. Other video adaptations are also suitable for use.

Physical adaptations may include the use of layered video displays with a set distance between the displays. Traditional mechanical reel gaming machines arranged the mechanical reels behind a glass layer, which included screen printing or printed decals attached to the glass. The printing indicated rules for the game, pay tables, and various game graphics. In this multiple video display embodiment, a proximate display device, such as an LCD, includes video data that mimics the glass layer and information typically printed on the glass layer. To increase realism, video data sent to the proximate display device may also include video data for glare lines and other depictions of interaction of the stickers with an environment around a gaming machine. Video data emulating the stickers may also include video fraying and video discoloration (e.g., dirt that simulates age) to add the realistic simulation of aged and actual stickers. A second display device, behind the first, which may also be an LCD, then includes video data that simulates the mechanical reels. Physical separation of the two video displays mimics the same separation seen between the glass and reels in a tradition mechanical gaming machines, and significantly adds to the illusion of a real mechanical system. For example, this adds parallax, an actual three dimensional (3D) effect of real reel gaming machines, where a person variably sees portions of the distal display, through windows on the proximate display, based on their position relative to the gaming machine. Lighting is another physical adaptation that may be emulated by a processor-based gaming machine. This may include video graphics that emulate lighting conditions on mechanical reels, such as fore-lighting and back-lighting.

Individually, each of these physical, audio and video adaptations may not create a full illusion of a mechanical reel machine. Cumulatively, however, when a plurality of these adaptations are simultaneously provided in a processor-based gaming machine, senses for a person near the gaming machine process numerous indications of a real mechanical reel machine, and the person may be at least partially or temporarily fooled into perceiving a real mechanical reel machine.

While embodiments described herein are not an exact replacement for a truly mechanical machine, they are believed to be a reasonable match that preserves some or most of the "look and feel" of mechanical reel-based machines. These digital machines may satisfy many players looking for a mechanical reel-based machine, while avoiding the associated costs and complexities of old mechanical machines, and permitting the benefits of digital machines. For example, processor-based display devices permit easy reconfiguration of video output, including remote reconfiguration. The digital nature of the video display devices permits the reel game on a gaming machine to be changed using digital techniques. This allows symbols on the video reels to be changed to present a different reel game, if desired. Or this also allows the number of reels output by the video display devices to change. Wireless or wired connection to the gaming machine also permits remote changes to games by downloading instructions for the changes.

In one embodiment, the separable video graphics are dynamic. As mentioned above, dynamic separable graphics move between layered video display devices 18 during game play.

FIGS. 5C-5E show dynamic graphics for a reel game according to a win in accordance with a specific embodiment.

FIG. 5C shows the video graphics for proximate video display device 18*a* and distal video display device 18*c* in which a "jumping wild" 160 symbol first appears on the reels on the distal video display device 18*c*.

FIG. 5D shows the "jumping wild" symbol 160 moving from distal video display device 18*c* to the proximate video display device 18*a* and temporarily appearing on both proximate video display device 18*a* and distal video display device 18*c* in the same x-y position for both screens.

FIG. 5E shows the "jumping wild" symbol 160 laterally moving on proximate video display device 18*a* to an adjacent transparent window 15 and over another reel 125.

While not shown, symbol 160 may then return to distal video display device 18*c* and replace the reel symbol (a cherry, as shown in FIG. 5C) previously included in that reel symbol location.

Figure 7A:
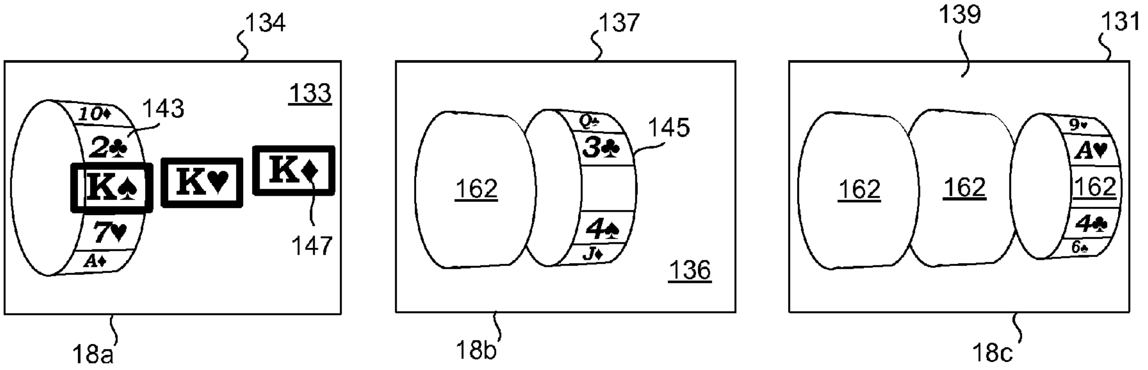
FIGS. 7A and 7B show another example of animated and dynamic separable graphics in accordance with a specific embodiment.

In embodiments where the layered displays include filter-type panels that share a backlight, a controller or processor sends a signal to convert areas on one or more distal layers to transparent (and transmissive of light) to permit light from a backlight to reach one or more proximate layers. This is particularly useful when a single backlight is used behind all the layered displays. As shown in FIG. 5E, a portion 162 of distal video display device 18*c* that overlaps the x-y position of symbol 160 on proximate video display device 18*a* has been converted to transparent, to let light from a backlight illuminate symbol 160 on proximate video display device 18*a*. The overlap refers to a shared or corresponding x-y position between the two screens along the common line of sight. FIG. 7*a* shows another example of transparent portions 162 on two distal video display devices 18*b* and 18*c*. The transparent portions 162 may be enumerated using x-y pixel numbers for each screen, for example. In a specific embodiment, all portions of a front display video device 18*a* that include graphics have their corresponding and overlapping portions of a distal portions 162 display device 18*c* turned to transparent.

FIGS. 6A-6F show dynamic graphics for a reel game in accordance with another specific embodiment in which a "free spin bonus" 170 symbol transitions between screens and changing sizes as it does so.

Figure 6A:
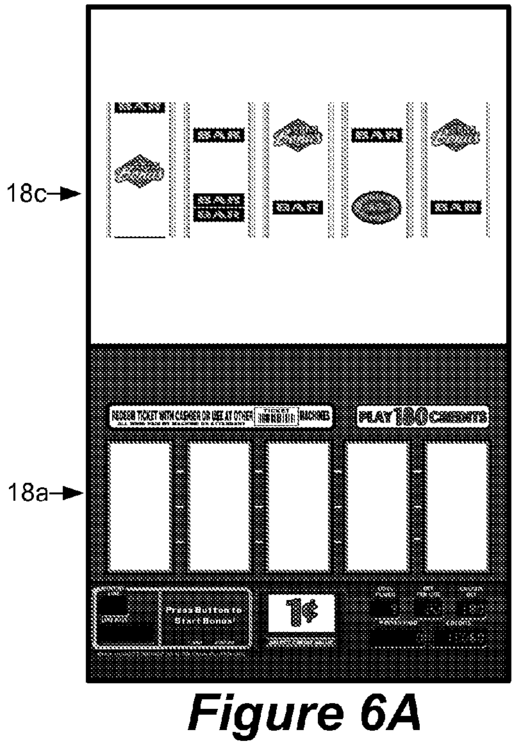
FIGS. 6A-6F show dynamic graphics for a reel game in accordance with another specific embodiment.
Figure 6B:
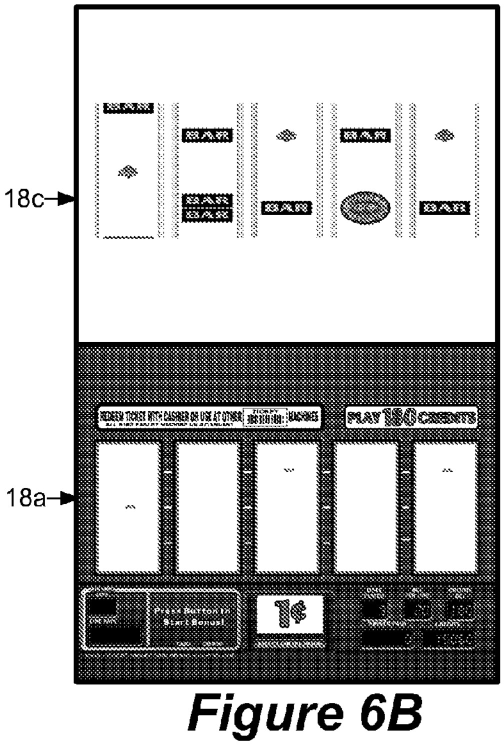
Figure 6C:
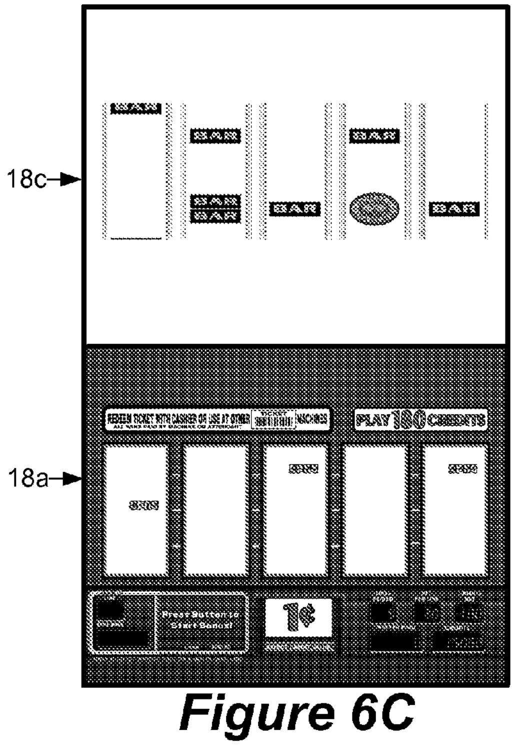
Figure 6D:
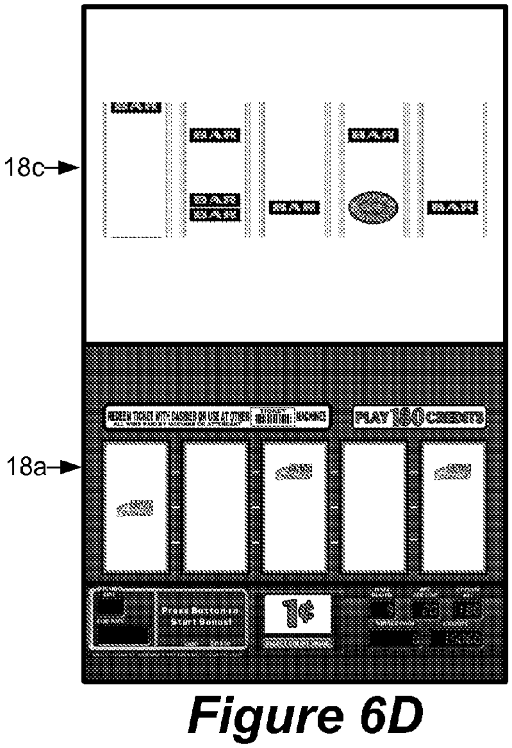
Figure 6E:
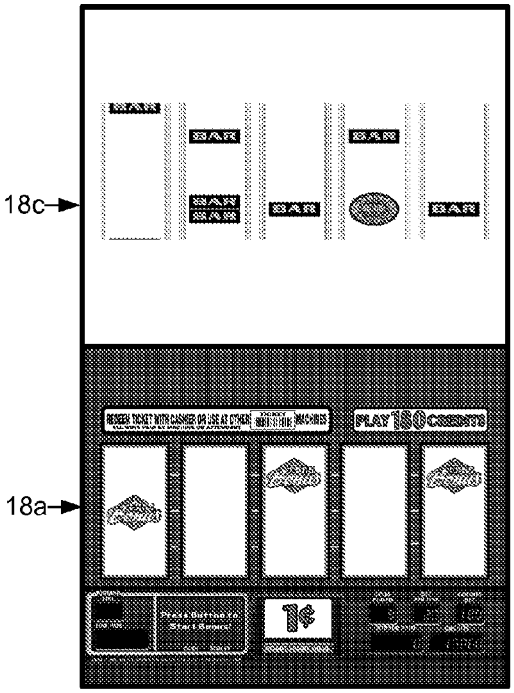

FIG. 6A shows the video graphics for proximate video display device 18*a* and distal video display device 18*c* in which a "free spin bonus" 170 symbol appears as a regular symbol on the reels on the distal video display device 18*c*.

Figure 6F:
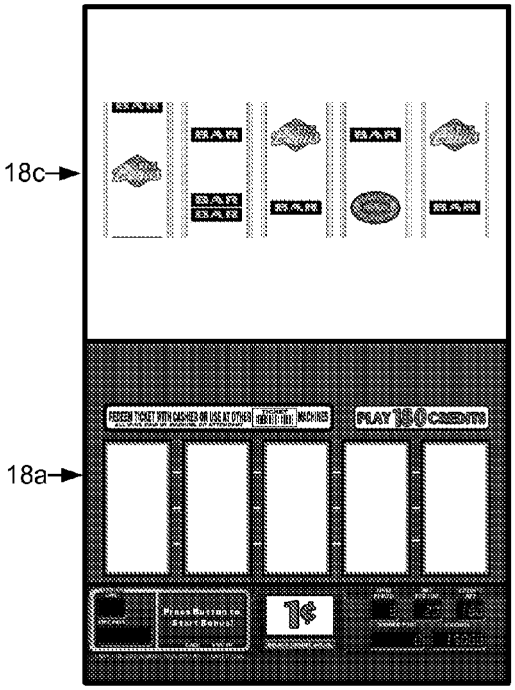

In this case, the "free spin bonus" 170 appears on proximate video display device 18*a* by gradually enlarging, while disappearing from distal video display device 18*c* by gradually shrinking. FIGS. 6B-6E show a few snapshots of this progression, in which "free spin bonus" 170 reduces from its initial size on distal video display device 18*c* to disappearing in FIG. 6C, while "free spin bonus" 170 enlarges from a subset of words on proximate video display device 18*a* (FIG. 6B) to its full size in FIG. 6E. FIG. 6F shows "free spin bonus" 170 after returning to distal video display device 18*c*.

In a specific embodiment, the dynamic graphics between layered displays also add animation of the graphics. One example of separable and animated video graphics for a reel game: a slots game where three 7's across a pay line indicates a win combusts the sevens—both on the distal video display device 18*c* that includes the simulated reels and on a proximate video display device 18*a* that also includes combustion effects such as fire and smoke—overlaid over the simulated reels 125 on the distal video display device 18*c*.

Figure 7B:
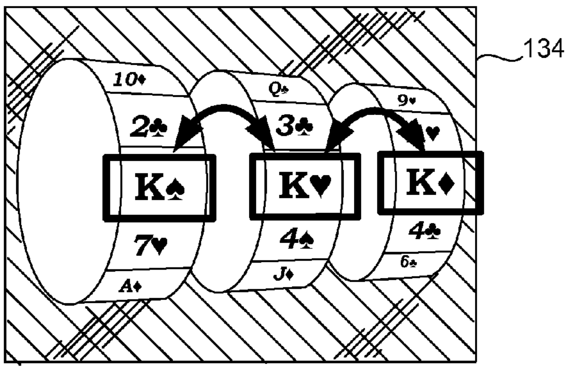

FIGS. 7A and 7B show another example of animated and dynamic separable graphics in accordance with a specific embodiment. In this example, a video poker reel includes three video reels, each on a separate layered display 18*a*-18*c*, as shown in FIG. 7A. For a winning outcome (FIG. 7B), the video reel or poker game include Jacks, Queens or Kings that animate to show the win. The animation may include caricatures for the Jacks, Queens or Kings that move between video reels, jump from one screen to another, walk from one screen to another, move across a screen, communicate with each other, combinations thereof, etc.

Thus, the layered display devices are used to provide 3D effects between the layers. Such effects were not possible with old mechanical reel devices where the real symbols were fixed (and two-dimensional), or with single-plane LCD panels where the graphics were limited to 2D.

In another dynamic and separable graphics 3-D video example, distal video display device 18*c* shows an image of a card dealer, who deals cards that are displayed on the proximate video display device 18*a*. This provides a person with a three-dimensional view of the card game in which the cards physically come forward between the video display devices. In this case, cards in a video poker game may 'jump' to the front screen so as to create the impression of a hand being provided to, and held by, a person. The distal display 18*c* may then include a poker table and dealer, which remains in the background visually (with real depth) as long as the player views his hand on the front display. This creates the 3-D perception of holding a hand. Blackjack and other card games may similarly be presented using layered displays.

In another specific embodiment, the front display is used to provide sizing and parallax. For example, a dealer may be disposed on the front display, while people are walking in behind the dealer in the back display. In other words, the layered displays are used to provide separate contextual information that also affirms depth perception.

As another dynamic and separable graphics example, coins may jump from a distal video display device to a proximate video display device, where they are rotated in the proximate display for selection by a player. This may be a bonus game, for example. The video reel game then remains on hold in the distal display, while the bonus game of selecting between three coins is portrayed on the proximate display. The coins may increase in size as they move from the distal display to the proximate display to add to the real perception of depth. When the layered displays share a backlight, spatial portions on the distal display overlapping the coins are turned transparent.

In a roulette example, a center of the distance between three layered video display devices is set as a center of the roulette wheel. Numbers on the perimeter of the roulette wheel then move in and out between the proximate video display device and distal video display device. This creates a 3-D effect where the numbers on the roulette wheel actually approach and retreat from a person standing in front a game machine.

In a dice game, such as video craps or video sic-bo, the layered video display devices are used to enhance presentation of dice as they jump and hit walls and other objects in the visual presentation. In this case, the dice may jump in between and back and forth between the front and distal video display devices. Other games are suitable for use herein.

Figure 11A:
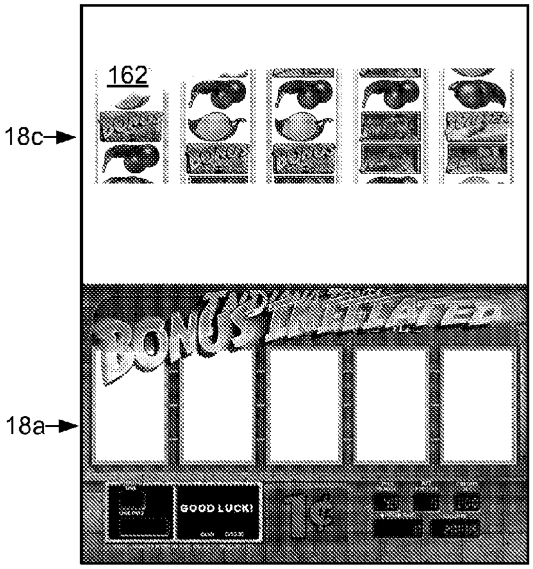
FIGS. 11A-11D show another example of a video sequence that uses the layered displays to provide coordinated 3-D output and separable content to a user in accordance with another specific embodiment.

FIGS. 11A-11D show another example of a video sequence that uses the layered displays to provide coordinated 3-D output and separable content to a user in accordance with another specific embodiment. In this case, an "Indiana Jones" reel game includes a bonus game that initiates when the video reel symbols include a predetermined number of 'bonus' symbols 402 (three in the example shown in FIG. 11A). To begin, letters for 'Bonus Initiated' 402 are displayed on the proximate video display device 18*a* (FIG. 11A).

Figure 11B:
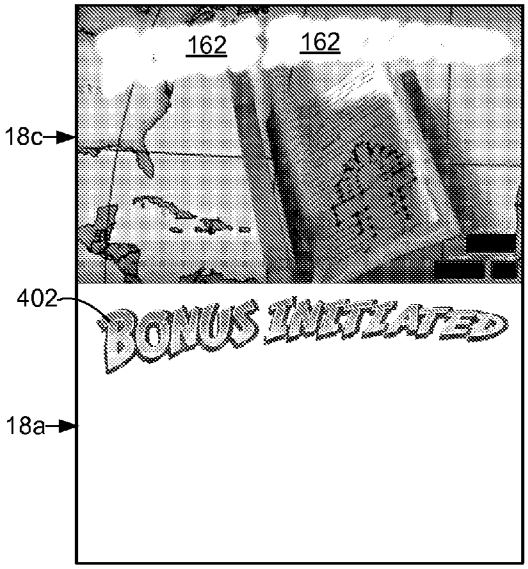

In FIG. 11B, the video supplied to distal display device 18*c* changes from the reels to a rustic global map and a rustic book animation that opens and flies eastward across the map from North America to Europe, while the 'Bonus Initiated' remains on proximate display device 18*a*. In this case, the layered displays include filter-type panels that share a backlight, and a portion 162 of distal video display device 18*c* that overlaps the x-y position of letters for 'Bonus Initiated' converts to transparent to permit light from the distal backlight to reach the letters in proximate display device 18*a*. Display of the rustic book also includes video shading to provide perception of three dimensions within the video for distal display device 18*c*.

Figure 11C:
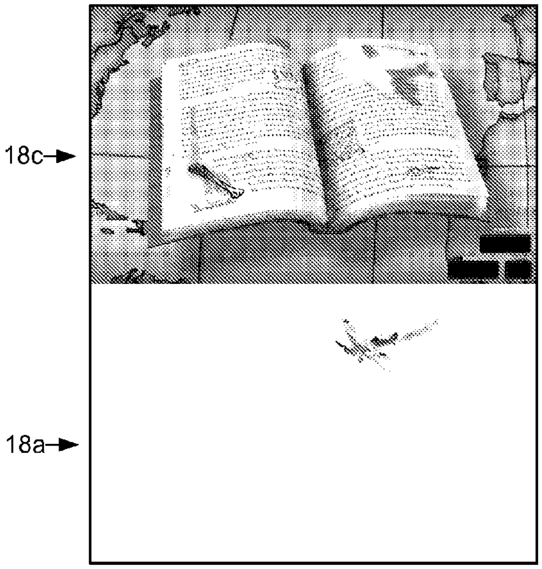
Figure 11D:
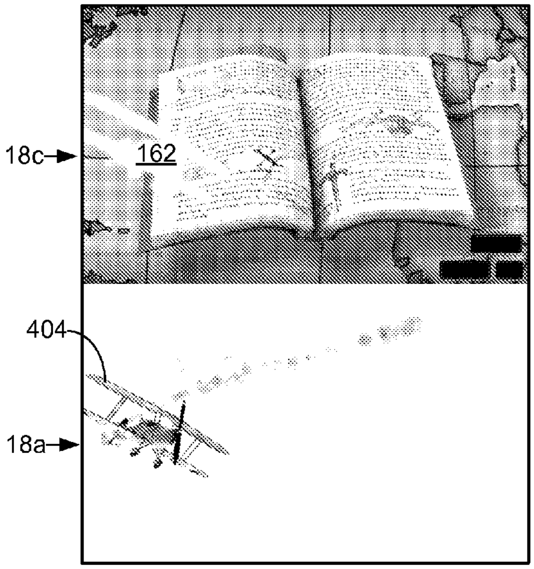

Also, as shown in FIGS. 11C and 11D, an airplane 404 animation appears on, and moves across, the proximate video display device 18*a*. The airplane 404 may initiate from the book on distal video display device 18*c*, or from a portion of proximate video display device 18*a*, grow in size as it nears the person, etc. The airplane 404 provides separable content and parallax relative to the video on distal display device 18*c*. Movement of the airplane 404 is very noticeable: not only does a person detect the relative motion of the book and map, the person also detects the relative motion of airplane 404 relative to both the book and map, in addition to the actual depth between the airplane 404 and book/map. Cumulatively, the profusion of moving and separable content provides an abundance of video information to the person's visual processing system, which leads to very exciting game content.

Figure 12A:
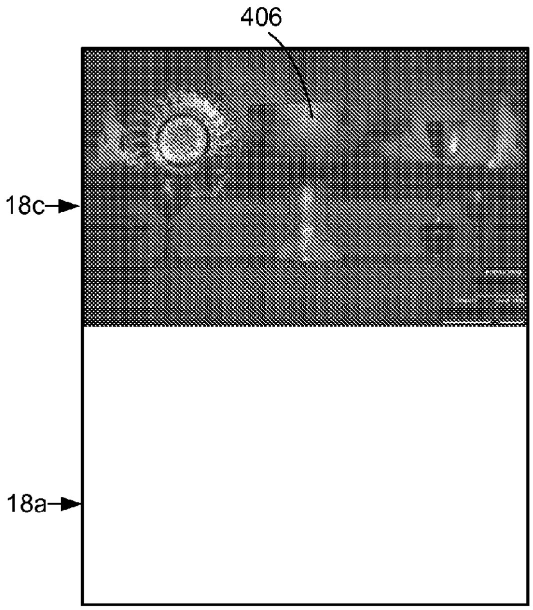
FIGS. 12A and 12B show another example of separable content in accordance with another specific embodiment.
Figure 12B:
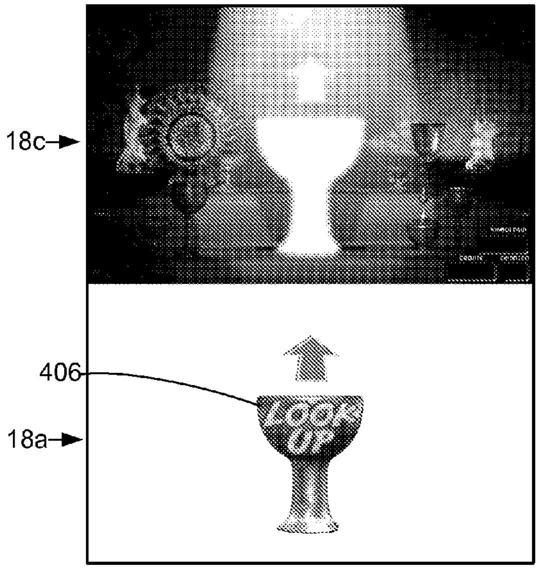

FIGS. 12A and 12B show another example of video that uses the layered displays to provide separable content in accordance with another specific embodiment. In this case, which is a second bonus game for an "Indiana Jones" reel game, a video depiction 406 of the Holy Grail 406 first appears on distal video display device 18*c*. The Holy Grail 406 transfers screens to proximate video display device 18*a*, and may include a video prompt to the user to begin the bonus game. In this case, the gaming machine includes a bonus device, such as a bonus wheel or a third video device, in the top box of the gaming machine that outputs the bonus game, and distal video display device 18*c* provides video data that informs the person to look up to the bonus device.

Other video graphics may leverage the layered displays. The digital nature of video permits more designer flexibility in attracting attention to a symbol. For example, winning video symbols may change size, shake, vibrate, bounce up and down, change to different symbols, move between screens, become animated, combinations thereof, etc. These effects are not feasible with a traditional mechanical gaming machine, which contains symbol images unalterably printed on a reel strip. Unlike the more traditional and less dramatic effects previously described with respect to FIGS. 5 and 6, these effects are likely to contradict the perception of an actual mechanical reel stepper machine. This is a trade-off, available to game designers, is made possible by the highly adaptable nature of the digital video simulation and visual value of these video changes.

In another specific example, the gaming machine generates a game image on a distal video display device and a flashing translucent image on a proximate video display device. The game could for example, be reels or one or more wheels, and a flashing image on the proximate display could be a translucent line that indicates the payline(s) on the reels. Since some games permit multiple paylines based on the person's wager, this permits the game to show multiple paylines responsive to the person's actions. Alternatively, the proximate video display device may show a symbol or message that provides a player with helpful information such as a hint for playing the game.

In one embodiment, the gaming machine presents different game types on the layered display devices. For example, the distal and backmost display device may output a main game with reels 125 while a proximate video display device shows a bonus game or progressive game. The bonus game or progressive game may result from playing the main game.

The layered video display devices provide other potential benefits. For example, their digital nature permits external loading and changing of games and graphics. This permits a casino or gaming establishment to change video on each of the layered display devices without physically altering the gaming machine or requiring maintenance. Thus, the number of virtual slot reels may be changed from 3 to 5 to 9, or some other number. In this case, the intermediate and distal video display devices change the position of their transparent window portions 15 for viewing of the different number of virtual slot reels. Symbols on each virtual slot reel 125 may also be changed. Also, a pay table shown on display device 18*a* may be changed, in addition to changing whether a bonus or progressive game is shown on the distal video display device. This permits the same gaming machine to play new games simply by downloading a data onto the machine. For a mechanical machine, this game change traditionally required manual and mechanical reconfiguration of a gaming machine, e.g., to change the number of reels for new reel game that requires five reels instead of three.

In one embodiment, the layered video display devices are all-digital and permit reconfiguration in real time. This permits new or different games to be downloaded onto a gaming machine, and reconfiguration of the three display devices to present a new or different game using any combination of the display devices. Game aspects changed in this manner may include: reel symbols, the paytable, the game theme, wager denominations, glass plate video data, reel strips, etc. For a casino, or other gaming establishment, this permits a single gaming machine to offer multiple games without the need for gaming machine maintenance or replacement when a new game is desired by casino management or customer demand. On one day, the gaming machine may offer games using all the layered display devices. The next day, the same gaming machine may offer a game that only uses an outer LCD panel and touchscreen, where the distal displays are set to their fully transmissive mode (when a single backlighting system is employed) or, with other display lighting schemes, where a shutter (or other technology on front display) blocks out the back display devices. Some other subset of the layered displays may also be used. This permits dual-dynamic display device reconfiguration and/or game reconfiguration, at will, by downloading commands to the gaming machine that determine a) what game(s) is played, and b) what display device(s) is used. For example, this allows the same gaming machine to run a reel game one day and a video poker game another day that uses some subset of the display devices.

This reconfiguration of display devices used and games also enables new uses for gaming machines. Traditionally, a casino or other gaming establishment purchased a gaming machine and offered games only according to its display capabilities. If a casino purchased 250 gaming machines that only had LCD panels, and then later decided they wanted to implement reel games or other games that required more than an LCD panel, they were forced to purchase new gaming machines. Gaming machine 10, however, solves this problem for a casino. Accordingly, gaming machines as described herein permit a gaming establishment to switch the number of display devices used by a gaming machine to display a game.

One business advantage of this dual-dynamic display device reconfiguration and/or game reconfiguration is navigating gaming regulations imposed by different jurisdictions, which often change over time. First, each jurisdiction imposes its own set of rules on what games are locally permissible. Second, gaming regulators in each jurisdiction often change the local rules. This is particularly common for new gaming regulators and jurisdictions allowing casinos for the first time. The new gaming regulators may only permit class 2 games at first (e.g., bingo) and later permit class 3 games (video poker and reel games, one year later). Gaming machine 10 allows a casino in this jurisdiction to adapt, instantly, to a regulations change with a) new games and b) new display device arrangements that were already on gaming machine 10 but not previously used. Thus, when some jurisdictions limit the number and types of games that can be played, gaming machines described herein allow a casino to switch games—on the fly without significant gaming machine maintenance or downtime in the casino—when jurisdiction rules change.

Additionally, the enhanced utility and regulatory acceptance of a viable stepper simulation using video in lieu of mechanical reels permits mechanical-simulated games in new environments. Some jurisdictions do not permit the use of actual mechanical reel machines but do allow all forms of video-based gaming machines, which permits embodiments described herein to service mechanical reel customers in these jurisdictions.

One of the display devices in a layered arrangement may also output live video such as television or a movie (or parts of either). For example, the television or movie video may be output on a rear display while a game is played on a proximate display. This permits a person to watch television or a movie while playing a game at a gaming machine, without changing position or line of sight to switch between the game and live video. The live video may also be related to the game being played to enhance enjoyment of that game, e.g., a science fiction movie related to a science fiction game being played or a 1960's television show related to a 1960's television game. The video may also play commercials and promotional messages for the gaming establishment, such as advertisements and infomercials for businesses related to a casino or businesses that pay for the advertising opportunity. Advertisements may include those for a local restaurant, local shows, -house offers and promotions currently offered, menus for food, etc.

Figure 8A:
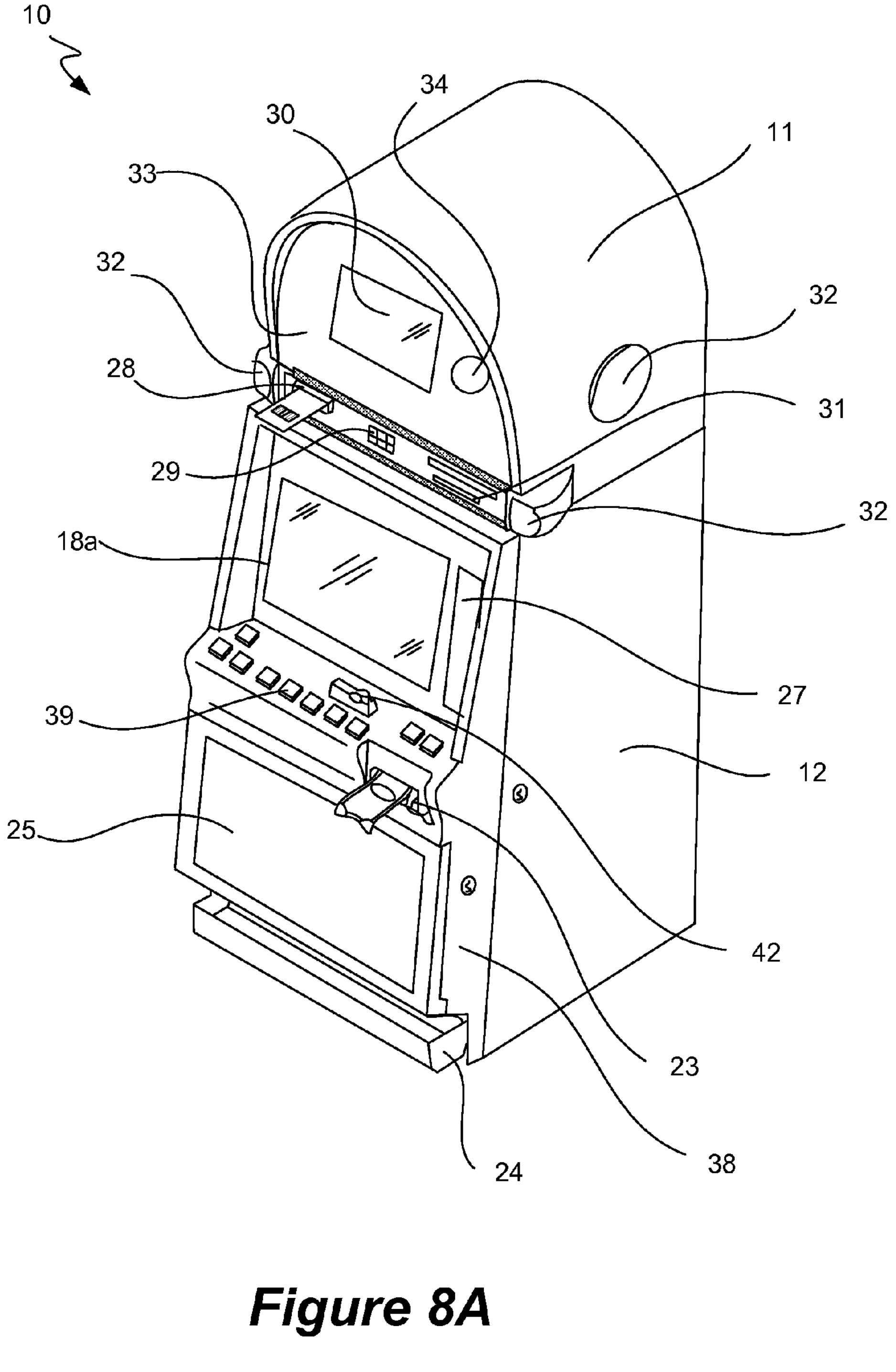
FIGS. 8A and 8B illustrate a gaming machine in accordance with a specific embodiment.
Figure 8B:
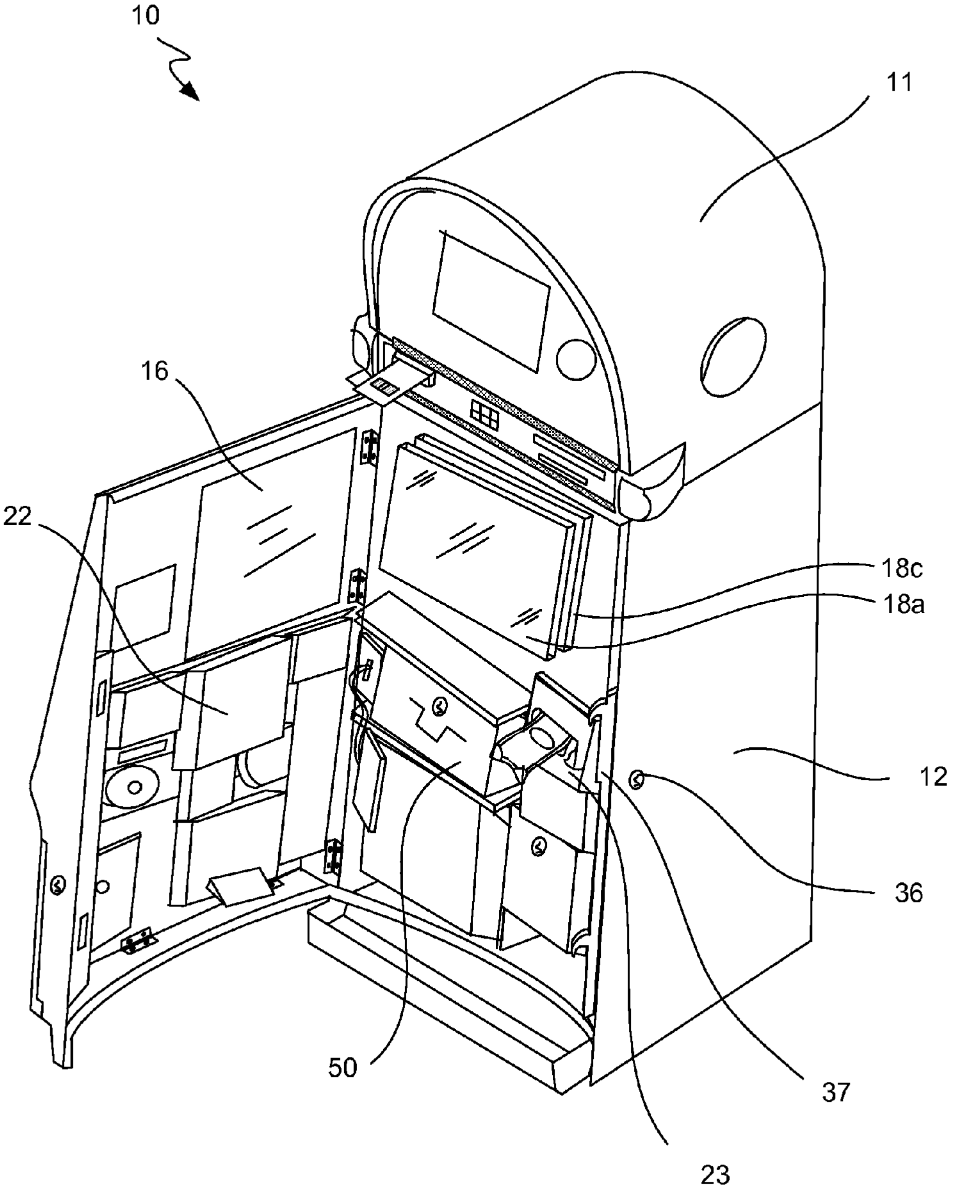

Embodiments described herein may be implemented on a wide variety of gaming machines. For example, the video reels may be output by a gaming machine as provided by IGT of Reno, Nev. Gaming machines from other manufacturers may also employ embodiments described herein. FIGS. 8A and 8B illustrate a sample gaming machine 10 in accordance with a specific embodiment. Gaming machine 10 is suitable for providing a game of chance and displaying video data that includes one or more simulated mechanical imperfections of a mechanical reel.

Gaming machine 10 includes a top box 11 and a main cabinet 12, which defines an interior region of the gaming machine. The cabinet includes one or more rigid materials to separate the machine interior from the external environment, is adapted to house a plurality of gaming machine components within or about the machine interior, and generally forms the outer appearance of the gaming machine. Main cabinet 12 includes a main door 38 on the front of the machine, which opens to provide access to the interior of the machine. The interior may include any number of internal compartments, e.g., for cooling and security purposes. Attached to the main door or cabinet are typically one or more player-input switches or buttons 39; one or more money or credit acceptors, such as a coin acceptor 42, and a bill or ticket scanner 23; a coin tray 24; and a belly glass 25. Viewable through main door 38 is the exterior video display monitor 18*a* and one or more information panels 27.

Top box 11, which typically rests atop of the main cabinet 12, may also contain a ticket printer 28, a keypad 29, one or more additional displays 30, a card reader 31, one or more speakers 32, a top glass 33 and a camera 34. Other components and combinations are also possible, as is the ability of the top box to contain one or more items traditionally reserved for main cabinet locations, and vice versa.

It will be readily understood that gaming machine 10 can be adapted for presenting and playing any of a number of games and gaming events, particularly games of chance involving a player wager and potential monetary payout, such as, for example, a digital slot machine game and/or any other video reel game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or gaming terminal, in that all processing may be done at a remote server, with only the external housing, displays, and pertinent inputs and outputs being available to a player. Further, it is also worth noting that the term "gaming machine" may also refer to a wide variety of gaming machines in addition to traditional free standing gaming machines. Such other gaming machines can include kiosks, set-top boxes for use with televisions in hotel rooms and elsewhere, and many server based systems that permit players to log in and play remotely, such as at a personal computer or PDA. All such gaming machines can be considered "gaming machines" for embodiments described herein.

With reference to FIG. 8B, the gaming machine of FIG. 8A is illustrated in perspective view with its main door opened. In additional to the various exterior items described above, such as top box 11, main cabinet 12 and primary video displays 18, gaming machine 10 also comprises a variety of internal components. As will be readily understood by those skilled in the art, gaming machine 10 contains a variety of locks and mechanisms, such as main door lock 36 and latch 37. Internal portions of coin acceptor 22 and bill or ticket scanner 23 can also be seen, along with the physical meters associated with these peripheral devices. Processing system 50 includes computer architecture, as will be discussed in further detail below.

When a person wishes to play a gaming machine 10, he or she provides coins, cash or a credit device to a scanner included in the gaming machine. The scanner may comprise a bill scanner or a similar device configured to read printed information on a credit device such as a paper ticket or magnetic scanner that reads information from a plastic card. The credit device may be stored in the interior of the gaming machine. During interaction with the gaming machine, the person views game information using a video display. Usually, during the course of a game, a player is required to make a number of decisions that affect the outcome of the game. The player makes these choices using a set of player-input switches. A game ends with the gaming machine providing an outcome to the person, typically using one or more of the video displays.

After the player has completed interaction with the gaming machine, the player may receive a portable credit device from the machine that includes any credit resulting from interaction with the gaming machine. By way of example, the portable credit device may be a ticket having a dollar value produced by a printer within the gaming machine. A record of the credit value of the device may be stored in a memory device provided on a gaming machine network (e.g., a memory device associated with validation terminal and/or processing system in the network). Any credit on some devices may be used for further games on other gaming machines 10. Alternatively, the player may redeem the device at a designated change booth or pay machine.

Gaming machine 10 can be used to play any primary game, bonus game, progressive or other type of game. Other wagering games can enable a player to cause different events to occur based upon how hard the player pushes on a touch screen. For example, a player could cause reels or objects to move faster by pressing harder on the exterior touch screen. In these types of games, the gaming machine can enable the player to interact in the 3D by varying the amount of pressure the player applies to a touchscreen.

As indicated above, gaming machine 10 also enables a person to view information and graphics generated on one display screen while playing a game that is generated on another display screen. Such information and graphics can include game paytables, game-related information, entertaining graphics, background, history or game theme-related information or information not related to the game, such as advertisements. The gaming machine can display this information and graphics adjacent to a game, underneath or behind a game or on top of a game. For example, a gaming machine could display paylines on a proximate display screen and also display a reel game on a distal display screen, and the paylines could fade in and fade out periodically.

A gaming machine includes one or more processors and memory that cooperate to output games and gaming interaction functions from stored memory. FIG. 9 illustrates a control configuration for use in a gaming machine in accordance with another specific embodiment.

Processor 332 is a microprocessor or microcontroller-based platform that is capable of causing a display system 18 to output video graphics such as symbols, cards, images of people, characters, places, and objects which function in the gaming device. Processor 332 may include a commercially available microprocessor provided by a variety of vendors known to those of skill in the art. Gaming machine 10 may also include one or more application-specific integrated circuits (ASICs) or other hardwired devices. Furthermore, although the processor 332 and memory device 334 reside on each gaming machine, it is possible to provide some or all of their functions at a central location such as a network server for communication to a playing station such as over a local area network (LAN), wide area network (WAN), Internet connection, microwave link, and the like.

Memory 334 may include one or more memory modules, flash memory or another type of conventional memory that stores executable programs that are used by the processing system to control components in a layered display system and to perform steps and methods as described herein. Memory 334 can include any suitable software and/or hardware structure for storing data, including a tape, CD-ROM, floppy disk, hard disk or any other optical or magnetic storage media. Memory 334 may also include a) random access memory (RAM) 340 for storing event data or other data generated or used during a particular game and b) read only memory (ROM) 342 for storing program code that controls functions on the gaming machine such as playing a game.

A player uses one or more input devices 338, such as a pull arm, play button, bet button or cash out button to input signals into the gaming machine. One or more of these functions could also be employed on a touchscreen. In such embodiments, the gaming machine includes a touch screen controller 16*a* that communicates with a video controller 346 or processor 332. A player can input signals into the gaming machine by touching the appropriate locations on the touchscreen.

Processor 332 communicates with and/or controls other elements of gaming machine 10. For example, this includes providing audio data to sound card 336, which then provides audio signals to speakers 330 for audio output. Any commercially available sound card and speakers are suitable for use with gaming machine 10. Processor 332 is also connected to a currency acceptor 326 such as the coin slot or bill acceptor. Processor 332 can operate instructions that require a player to deposit a certain amount of money in order to start the game.

Although the processing system shown in FIG. 9 is one specific processing system, it is by no means the only processing system architecture on which embodiments described herein can be implemented. Regardless of the processing system configuration, it may employ one or more memories or memory modules configured to store program instructions for gaming machine network operations and operations associated with layered display systems described herein. Such memory or memories may also be configured to store player interactions, player interaction information, and other instructions related to steps described herein, instructions for one or more games played on the gaming machine, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

The processing system may offer any type of primary game, bonus round game or other game. In one embodiment, a gaming machine permits a player to play two or more games on two or more display screens at the same time or at different times. For example, a player can play two related games on two of the display screens simultaneously. In another example, once a player deposits currency to initiate the gaming device, the gaming machine allows a person to choose from one or more games to play on different display screens. In yet another example, the gaming device can include a multi-level bonus scheme that allows a player to advance to different bonus rounds that are displayed and played on different display screens.

Typically, using a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

Figure 10:
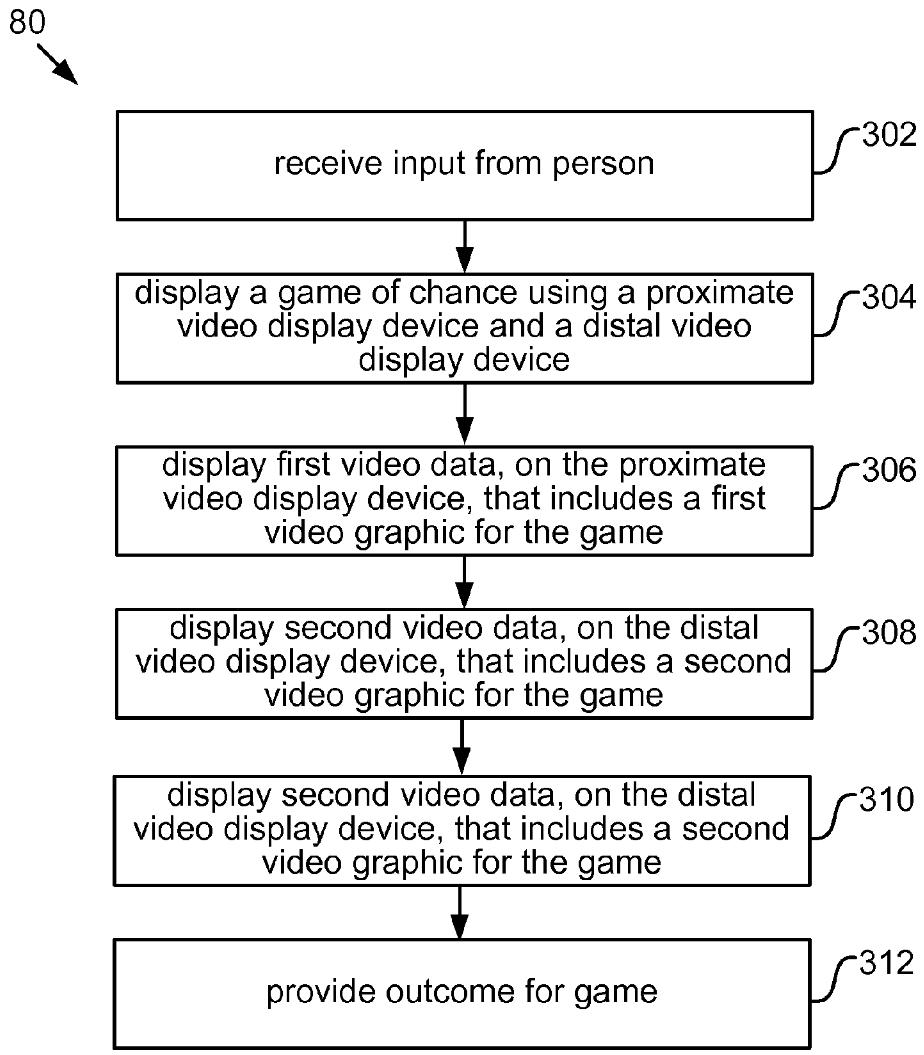
FIG. 10 shows a method of providing a game of chance on a gaming machine in accordance with one embodiment.

FIG. 10 shows a method 300 of providing a game of chance on a gaming machine in accordance with one embodiment. Method 300 will be described with respect to gaming machine 10 of FIGS. 8A and 8B.

Method 300 begins with receiving input from a person to begin game play (302). Often, a person inserts cash or credit through the coin acceptor 28 or bill validator 30. Bill validator may also accept a printed ticket voucher, which may be accepted by the bill validator 30 as indicia of credit. Once the gaming machine has accepted cash or credit, game play may commence on the gaming machine. Typically, a player may use all or part of the cash entered or credit into the gaming machine to make a wager on game play. During the course of a game, a player may be required to make a number of decisions that affect the outcome of the game. For example, a player may vary his or her wager, select a prize, or make game-time decisions that affect game play. These choices may be selected using the player-input switches, a touch screen or using some other device which enables a player to input information into the gaming machine including a key pad, a touch screen, a mouse, a joy stick, a microphone and a track ball.

During the game, gaming machine 10 displays the game of chance using a proximate video display device and a distal video display device (304). Suitable layered video display device arrangements were described above with respect to FIGS. 1A-1C. The game includes a visual presentation and various visual effects that can be perceived by a player. These effects add to the entertainment and excitement of a game, which makes a player more likely to continue playing. Many possible games are suitable for use herein, including video slot games, video poker, video pachinko, video black jack and video keno, may be provided with gaming machines of this invention. In general, the invention may be applied to any type of video game implemented on a gaming machine supporting video game presentations.

Video output on the layered video display device includes: displaying first video data, on the proximate video display device, that includes a first video graphic for the game (306), and displaying second video data, on the distal video display device, that includes a second video graphic for the game (308). Many suitable examples of video graphics provided to the layered video display devices were described above. Method 300 changes the first video graphic on the proximate video display device and changes the second video graphic on the distal video display device during the game.

When the game is finished, the gaming machine provides a game outcome 312 for the game, presents the game outcome to the player and may dispense an award of some type depending on the outcome of the game. Game outcome presentation may use many different visual and audio components such as flashing lights, music, sounds and graphics on the layered displays. After the player has completed a game, the player may receive game tokens from coin tray 38 or a ticket 20 from printer 30.

Although the foregoing invention has been described in some detail for purposes of clarity of understanding, it will be apparent that certain changes and modifications may be practiced within the scope of the appended claims. Therefore, the present examples are to be considered as illustrative and not restrictive, and the invention is not to be limited to the details given herein, but may be modified within the scope of the appended claims.

What is claimed is:

1. A method of providing a game on a gaming machine, the method comprising:

displaying the game using a proximate video display device and a distal video display device arranged along a common line of sight, wherein the proximate video display device and the distal video display device are arranged to include a set distance between a display panel in the distal video display device and a display panel in the proximate video display device, the set distance being less than about 10 centimeters, an interstitial element disposed between the proximate and distal video display devices, the interstitial element partially obscuring one or more pixels, the interstitial element reducing the appearance of interference patterns associated with video data displayed on the proximate video display device and the distal video display device;

displaying first video data, on the proximate video display device, that includes a first video graphic for the game;

displaying second video data, on the distal video display device, that includes a second video graphic for the game;

displaying the game, which changes the first video graphic on the proximate video display device and changes the second video graphic on the distal video display device during the game;

displaying, in addition to the first video graphic and the second video graphic, a game play symbol for use in determining an outcome of the game on at least one of the distal video display device and the proximate video display device and causing the game play symbol to move from the distal video display device to the proximate video display device or from the proximate video display to the distal video display;

changing the size of the game play symbol as it transitions between the distal video display device and the proximate video display device; and providing an outcome for the game wherein the position of the game play symbol on either the distal video display device or the proximate video display device at the end of the game can affect the outcome of the game.

2. The method of claim 1 further comprising converting a planar portion of the distal video display device, which overlaps a planar position of the first video graphic on the proximate video display device, to transparent.

3. The method of claim 1 further comprising converting a planar portion of the proximate video display device, which overlaps a planar position of the second video graphic on the distal video display device, to transparent.

4. The method of claim 1 wherein the game includes a reel game that displays multiple video reels, where each video reel includes multiple video symbols on a video reel strip, and the method further comprises displaying video data that simulates the movement of the multiple video symbols on each video reel during game play.

5. The method of claim 4 wherein the second video graphic includes a video reel and the first video graphic includes a symbol for the video reel.

6. The method of claim 4 wherein the first video graphic includes a first video reel and the second video graphic includes a second video reel.

7. The method of claim 1 wherein the first video graphic remains on the proximate video display device during the duration of the game and the second video graphic remains on the distal video display device during the duration of the game.

8. The method of claim 1 wherein the first video graphic and the second video graphic provide parallax for a viewer near the gaming machine.

9. The method of claim 1 further comprising moving the second video graphic from the distal video display device to the proximate video display device.

10. The method of claim 9 further comprising moving the second video graphic in the proximate video display device.

11. The method of claim 10 further comprising returning the second video graphic back to the distal video display device.

12. The method of claim 11 further comprising animating the second video graphic.

13. The method of claim 1 wherein the first video graphic is displayed on the proximate video display device during a winning event for the game.

14. The method of claim 1 wherein the first video graphic is displayed during a bonus game.

15. The method of claim 1, further including moving the game play symbol laterally on either the distal video display device or the proximate video display device.

16. The method of claim 1, further including displaying the game play symbol simultaneously on the distal video display device and the proximate video display device.

17. Logic encoded in one or more tangible media for execution and, when executed, operable to provide a game on a gaming machine, the logic including:

instructions for displaying the game using a proximate video display device and a distal video display device arranged along a common line of sight, wherein the proximate video display device and the distal video display device are arranged to include a set distance between a display panel in the distal video display device and a display panel in the proximate video display device, the set distance being less than about 10 centimeters, an interstitial element disposed between the proximate and distal video display devices, the interstitial element partially obscuring one or more pixels, the interstitial element reducing the appearance of interference patterns associated with video data displayed on the proximate video display device and the distal video display device;

instructions for displaying first video data, on the proximate video display device, that includes a first video graphic for the game;

instructions for displaying second video data, on the distal video display device, that includes a second video graphic for the game;

instructions for displaying the game, which changes the first video graphic on the proximate video display device and changes the second video graphic on the distal video display device during the game;

instructions for displaying, in addition to the first video graphic and the second video graphic, a game play symbol for use in determining an outcome of the game on at least one of the distal video display device and the proximate video display device and causing the game play symbol to move from the distal video display device to the proximate video display device or from the proximate video display to the distal video display;

instructions for changing the size of the game play symbol as it transitions between the distal video display device and the proximate video display device; and instructions for providing an outcome for the game wherein the position of the game play symbol on either the distal video display device or the proximate video display device at the end of the game can affect the outcome of the game.

18. A gaming machine comprising:

a cabinet defining an interior region of the gaming machine, the cabinet adapted to house a plurality of gaming machine components within or about the interior region;

a proximate video display device, disposed within or about the interior region, configured to output a visual image in response to a control signal;

a distal video display device arranged inside the interior region relative to the proximate video display device, where a common line of sight passes through the proximate video display device to the distal video display device, wherein the proximate video display device and the distal video display device are arranged to include a set distance between a display panel in the distal video display device and a display panel in the proximate video display device, the set distance being less than about 10 centimeters;

an interstitial element disposed between the proximate and distal video display devices, the interstitial element partially obscuring one or more pixels, the interstitial element reducing the appearance of interference patterns associated with video data displayed on the proximate video display device and the distal video display device; and at least one processor configured to execute instructions, from memory, that a) display first video data, on the proximate video display device, that includes a first video graphic for a game, b) display second video data, on the distal video display device, that includes a second video graphic for the game, c) display the game, which changes the first video graphic on the proximate video display device and changes the second video graphic on the distal video display device during the game, d) display, in addition to the first video graphic and the second video graphic, a game play symbol for use in determining an outcome of the game on at least one of the distal video display device and the proximate video display device and cause the game play symbol to move from the distal video display device to the proximate video display device or from the proximate video display to the distal video display wherein the position of the game play symbol on either the distal video display device or the proximate video display device at the end of the game can affect the outcome of the game, and e) cause the game play symbol to change in size as it transitions between the distal video display device and the proximate video display device.

19. The gaming machine of claim 18 wherein the display panel for the proximate video display device and the display panel for the distal video display device are about parallel.

20. The gaming machine of claim 18 wherein the first video graphic remains on the proximate video display device during the duration of the game and the second video graphic remains on the distal video display device during the duration of the game.

21. The gaming machine of claim 18 wherein the second video graphic begins on the distal video display device and moves to the proximate video display device.

22. The gaming machine of claim 18 wherein the first video graphic and the second video graphic provide parallax for a viewer near the gaming machine.

23. The method of claim 9, further comprising moving the first video graphic from the proximate video display device to the distal video display device.

24. The logic of claim 17, further comprising instructions for moving the second video graphic from the distal video display device to the proximate video display device or for moving the first video graphic from the proximate video display device to the distal video display device.

25. The gaming machine of claim 21, wherein the first video graphic begins on the proximate video display device and moves to the distal video display device.

26. The gaming machine of claim 18, wherein the processor is further configured to execute instructions that cause the game play symbol to move laterally on either the distal video display device or the proximate video display device.

27. The gaming machine of claim 18, wherein the processor is further configured to execute instructions that cause the game play symbol to be displayed simultaneously on the distal video display device and the proximate video display device.

* * * * *